(12) United States Patent
Tchira et al.

(10) Patent No.: US 10,285,346 B2
(45) Date of Patent: May 14, 2019

(54) WATER LEVEL INDICATOR

(71) Applicant: Dotchi, LLC, Miami, FL (US)

(72) Inventors: Harry Tchira, Miami, FL (US); Erik Allen Holmen, Lakewood Ranch, FL (US); Joel Raymond Chartier, Lakewood Ranch, FL (US)

(*) Notice: Subject to any disclaimer, the term of this patent is extended or adjusted under 35 U.S.C. 154(b) by 0 days.

(21) Appl. No.: 15/834,278

(22) Filed: Dec. 7, 2017

(65) Prior Publication Data
US 2018/0116136 A1 May 3, 2018

Related U.S. Application Data

(63) Continuation of application No. 14/864,362, filed on Sep. 24, 2015, now Pat. No. 9,872,446.

(51) Int. Cl.
*A01G 27/00* (2006.01)
*G01F 23/66* (2006.01)
*G01F 23/58* (2006.01)

(52) U.S. Cl.
CPC ........ *A01G 27/008* (2013.01); *G01F 23/58* (2013.01); *G01F 23/66* (2013.01)

(58) Field of Classification Search
CPC .... A01G 27/008; A01G 27/00; A01G 27/005; A01G 27/003; G01F 23/66; G01F 23/64; G01F 23/30
See application file for complete search history.

(56) References Cited

U.S. PATENT DOCUMENTS

| | | | |
|---|---|---|---|
| 3,552,058 A | 1/1971 | Fici | |
| 3,595,267 A * | 7/1971 | Anderson | G01F 23/247 137/558 |
| 3,775,904 A | 12/1973 | Peters | |
| 3,871,131 A * | 3/1975 | Berglund | A01G 27/04 47/81 |
| 4,528,774 A | 7/1985 | Skaife | |
| 4,916,858 A * | 4/1990 | Hobson | A01G 27/008 47/81 |
| 6,345,470 B1 | 2/2002 | Slaght et al. | |
| 7,171,783 B1 | 2/2007 | Fidotti | |
| 7,703,240 B2 | 4/2010 | Watson et al. | |
| 8,146,292 B2 * | 4/2012 | Brandstatter | A01G 27/02 47/79 |

(Continued)

FOREIGN PATENT DOCUMENTS

CN 2031197 U 1/1989
DE 20 2006 000 586 U1 5/2006

(Continued)

OTHER PUBLICATIONS

PLAYMOBIL USA Lechuza Classico Self-Watering Polypropylene Indoor/OutdoorPlanter, http://www.hayneedle.com/product/classicoindoorplanter.cfm, Retrieved from internet Feb. 16, 2015.

*Primary Examiner* — Kristen C Hayes
(74) *Attorney, Agent, or Firm* — Cozen O'Connor

(57) ABSTRACT

A water level indicator, and a self-watering planter containing same. The water level indicator having a top end and a bottom end, and a plurality of pushrods, each of the pushrods comprising an indicator flag cap and a float. The floats on each of the pushrods may each arranged such that the indicator flag cap of each pushrod is pushed towards the top end when liquid container is filled to different levels.

20 Claims, 31 Drawing Sheets

(56) References Cited

U.S. PATENT DOCUMENTS

| | | |
|---|---|---|
| 8,191,310 B2 | 6/2012 | Keats |
| 9,681,613 B2 * | 6/2017 | Stanford .............. A01G 27/008 |
| 2005/0005518 A1 | 1/2005 | Iseki et al. |
| 2016/0231159 A1 * | 8/2016 | Tiesman ................. G01F 23/30 |

FOREIGN PATENT DOCUMENTS

| | | | |
|---|---|---|---|
| DE | 10 2005 058 436 A1 | 6/2007 | |
| EP | 0 171 889 A1 | 2/1986 | |
| EP | 0455474 A2 * | 11/1991 | ............. G01F 23/00 |
| EP | 0464977 A1 * | 1/1992 | ........... G01F 23/164 |
| EP | 1 541 011 A1 | 6/2005 | |
| EP | 2 644 024 A1 | 10/2013 | |
| GB | 954530 A * | 4/1964 | ............. G01F 23/64 |
| WO | 2009/125023 A1 | 10/2009 | |

* cited by examiner

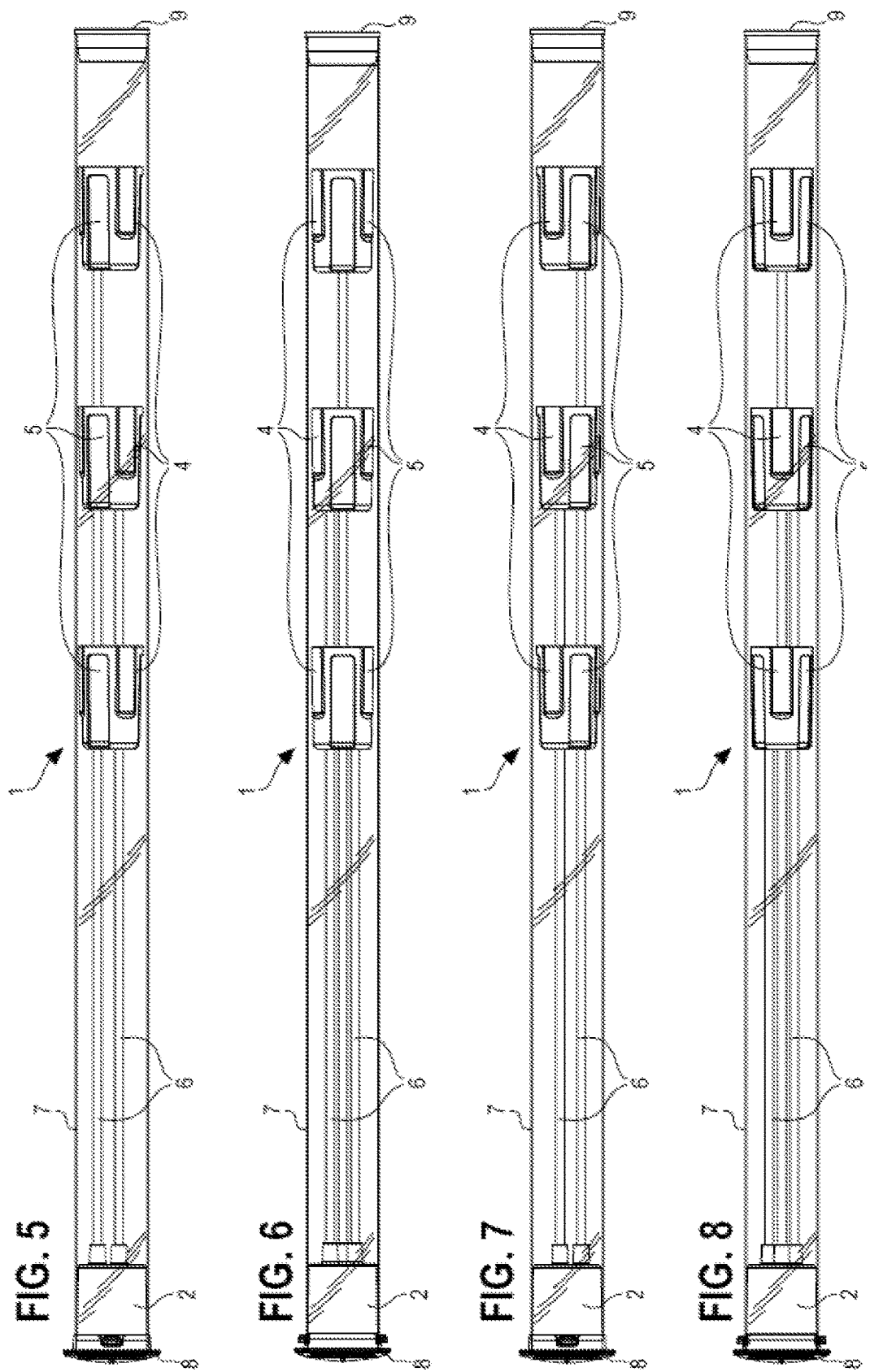

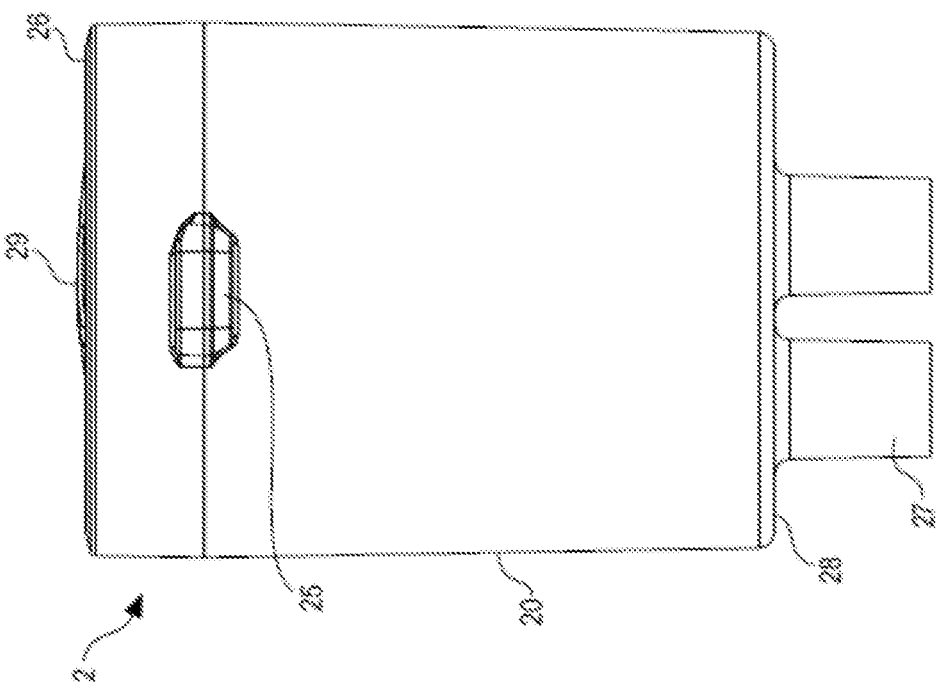
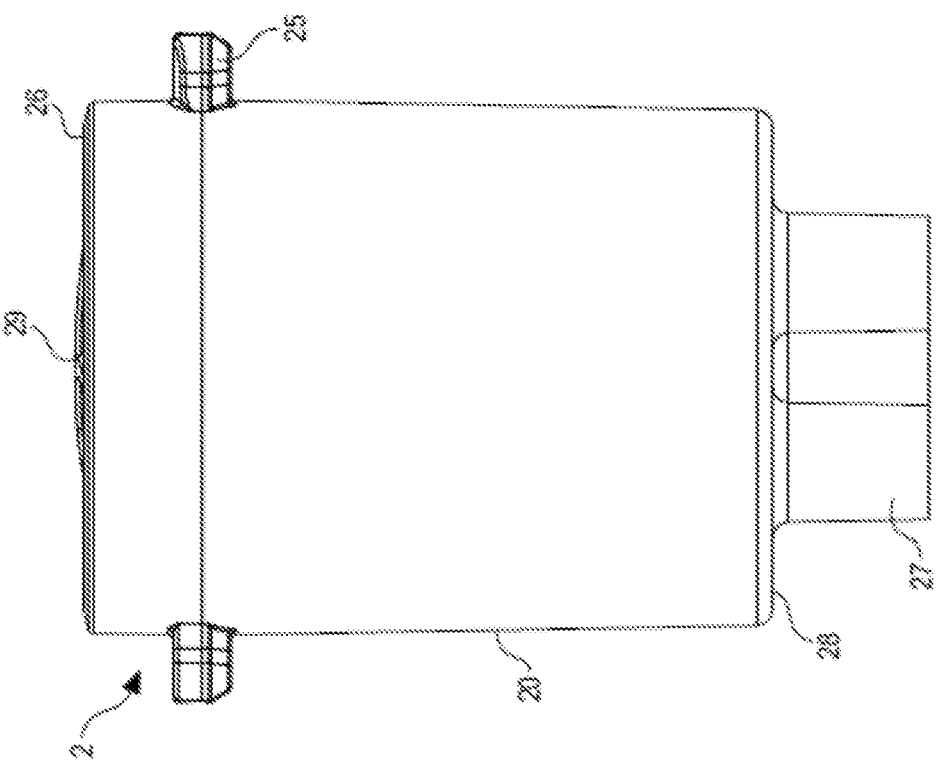

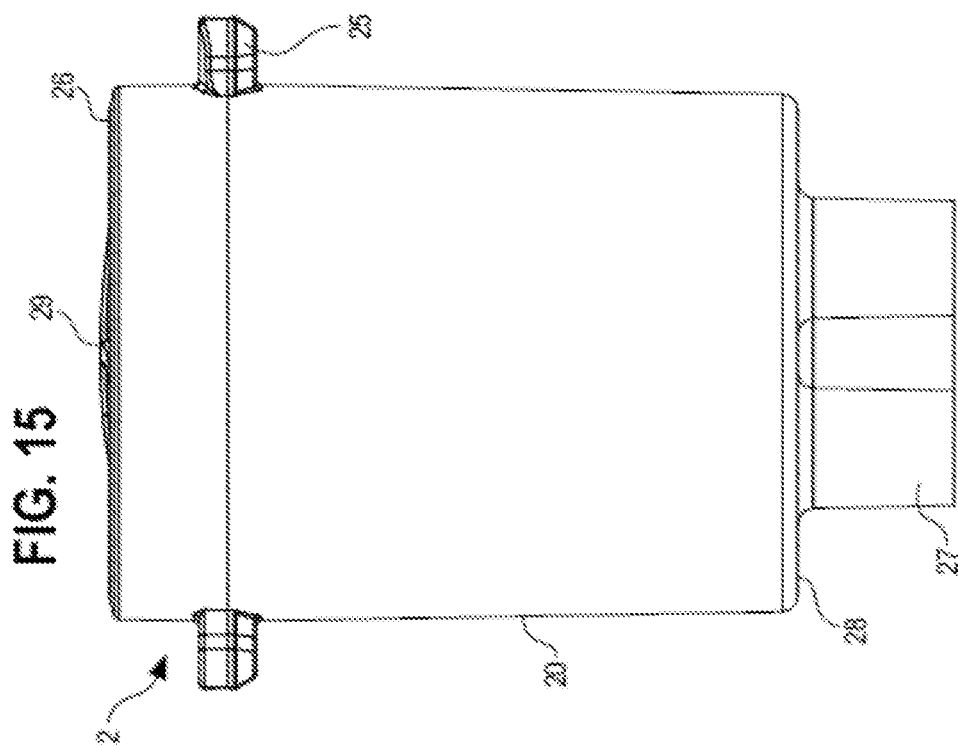
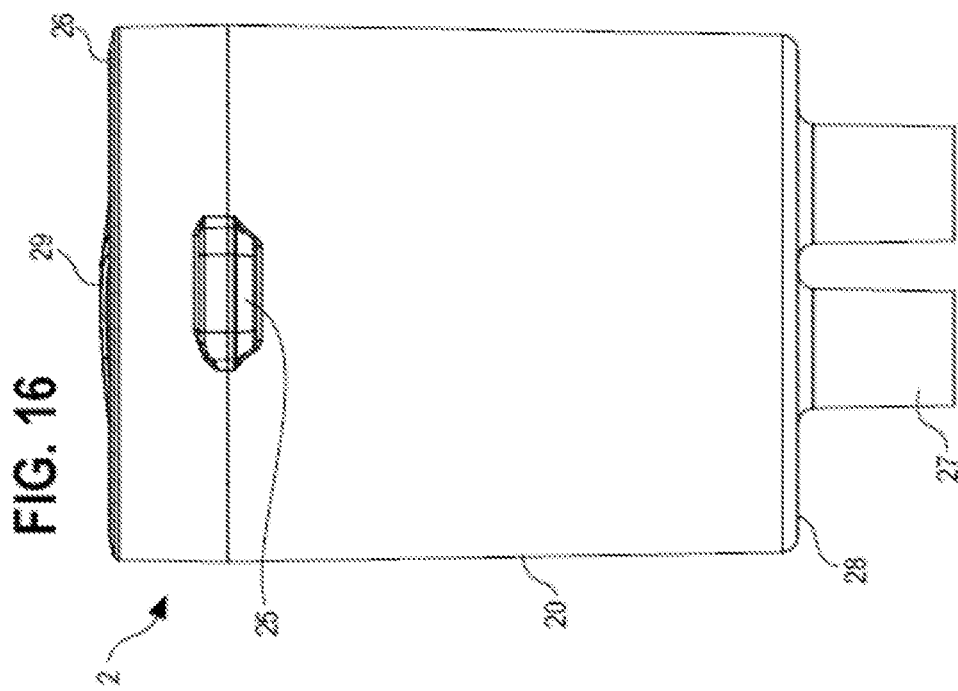

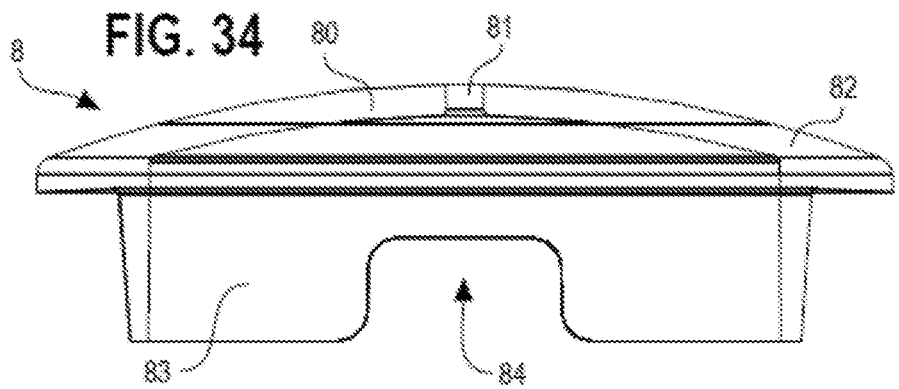
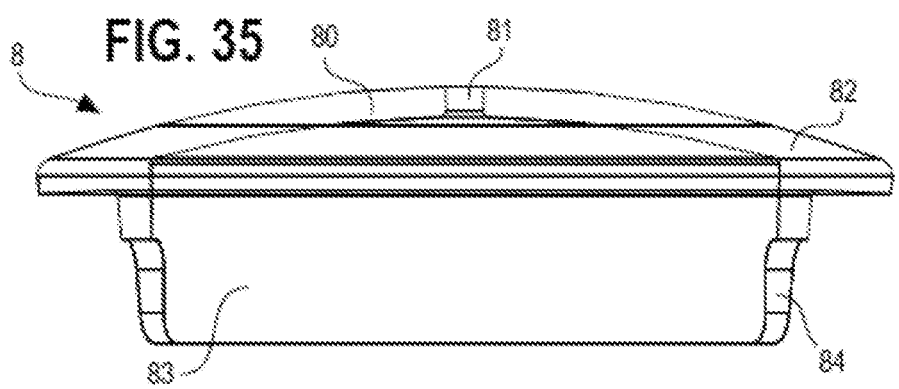
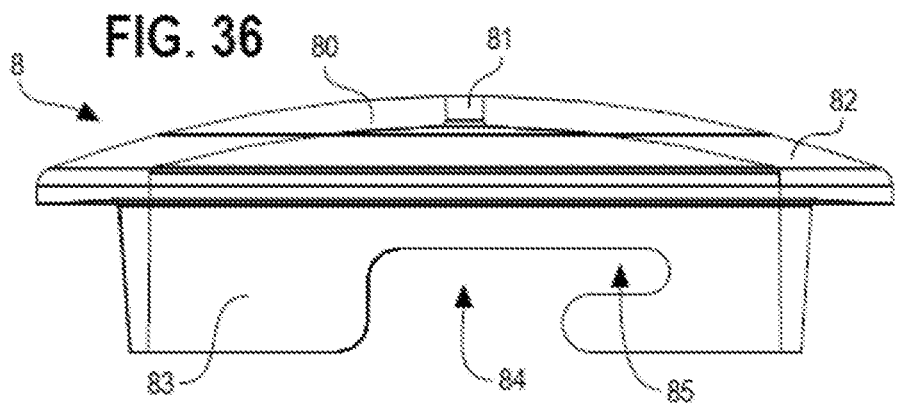

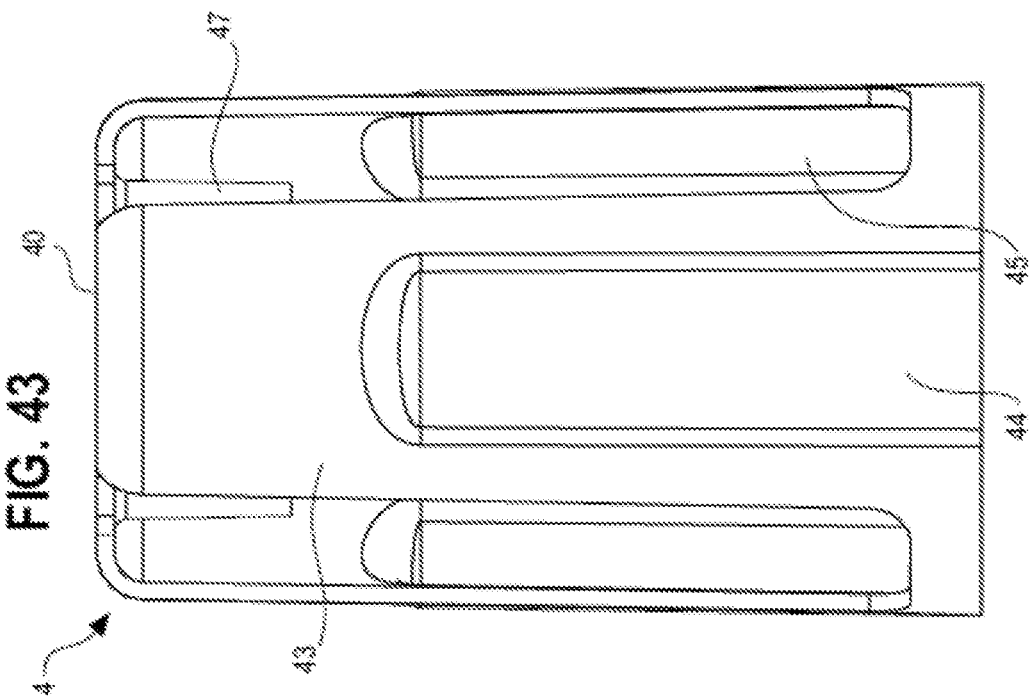
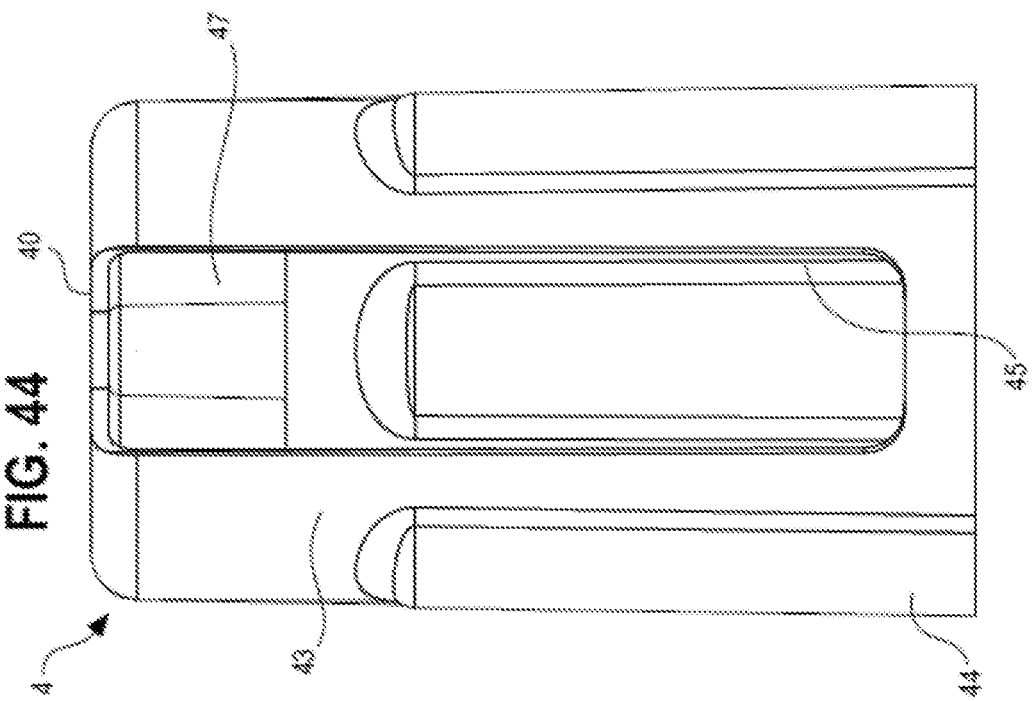

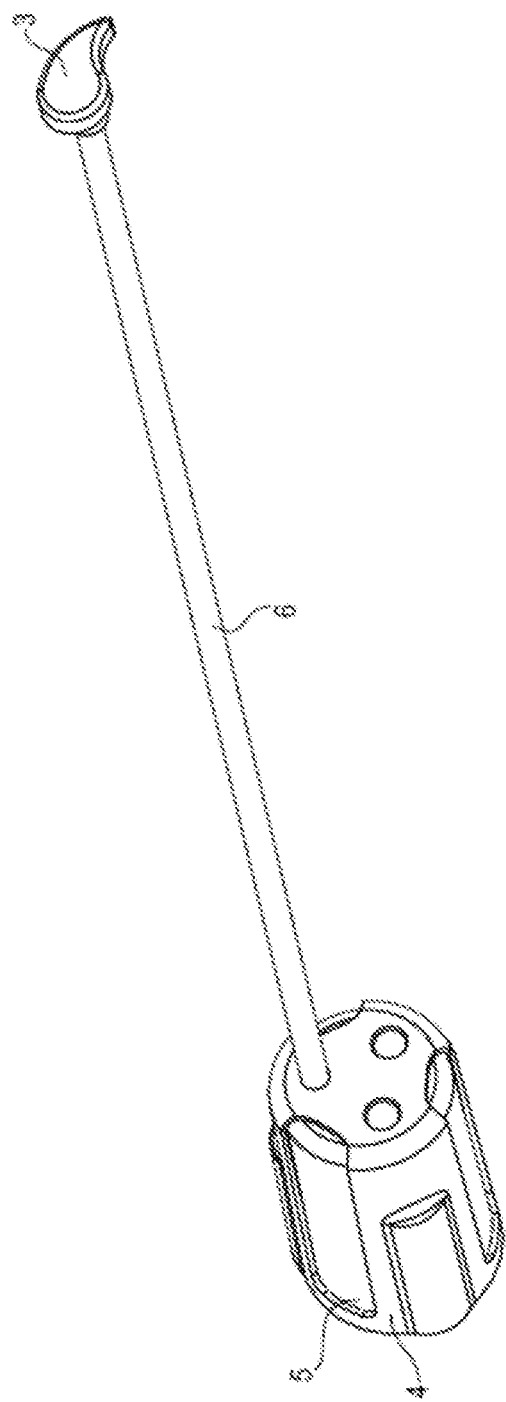

US 10,285,346 B2

WATER LEVEL INDICATOR

CROSS-REFERENCE TO RELATED APPLICATIONS

This application is a continuation of application Ser. No. 14/864,362 filed Sep. 25, 2015, the entire contents of which are herein incorporated by reference.

FIELD OF THE DISCLOSURE

The present disclosure generally relates to the field of water level indicators for liquid containers such as self-watering planters.

BACKGROUND

Water level indicators may be used in a variety of fields for various purposes, including self-watering planters, and other types of liquid storage containers. As used herein, a water level indicator may refer to any device that measures the amount of any liquid in any type of liquid container. As show in FIG. 60, prior art water level indicators based on a floating push rod may indicate the amount of liquid in the container based on how high the push rod extends above the surface of the water storage container within an observation cap. However such designs have practical limitations as to the depth of water or liquid that they can measure—based on how far above the surface the designer is willing to allow the pushrod to rise, and can also be unsightly where the appearance of liquid container is important to the designer, as with a decorative self-watering planter.

Other types of water level indicators may indicate the liquid level within a liquid container through the use of a window in the side of the liquid container. However, such water level indicators may only allow a user to observe the indicated water level by examining the window, which may not be easily read from all levels of the device. For example a planter with such a device put against a wall, or amongst other similar planters may require a user to crouch to view the water level indicator window, or turn the planter to access a view of an obscured window.

SUMMARY OF THE DISCLOSURE

The following presents a simplified summary of the disclosure in order to provide a basic understanding of some aspects of the invention. This summary is not an extensive overview of every embodiment disclosed herein. It is intended to neither identify key or critical elements of the various embodiments nor delineate the scope of the disclosure. Its sole purpose is to present some concepts of the disclosure, in accordance with the various embodiments disclosed herein, in a simplified form as a prelude to the more detailed description that is presented later.

In accordance with one embodiment, a water level indicator may have an upper housing, comprising a cavity, wherein a plurality of indicator flag caps may be disposed therein. A plurality of pushrods may each have a first end and a second end to define a length that is different from the lengths of the other pushrods in the plurality of pushrods. The first end of each pushrod in the plurality of pushrods may connect to a different indicator flag cap. The water level indicator may include a plurality of floats such that each float may have a locking hole, which receives and secures a second end of one of the plurality of pushrods. A first float of the plurality of floats may have its locking hole secure the second end of a first pushrod of the plurality of pushrods, and may further have at least one through hole which allows a second pushrod of the plurality of pushrods, to pass through the first float.

In accordance with one embodiment, a self-watering planter may include an internal wall and floor defining a plant cavity, an external wall surrounding a water reservoir, and an inlet capable of allowing water to enter the water reservoir. The self-watering planter may further have a water level indicator which may have an upper housing, comprising a cavity, wherein a plurality of indicator flag caps may be disposed therein. A plurality of pushrods may each have a first end and a second end to define a length that is different from the lengths of the other pushrods in the plurality of pushrods. The first end of each pushrod in the plurality of pushrods may connect to a different indicator flag cap. The water level indicator may include a plurality of floats such that each float may have a locking hole which receives and secures a second end of one of the plurality of pushrods. A first float of the plurality of floats may have its locking hole secure the second end of a first pushrod of the plurality of pushrods, and may further have at least one through hole which allows a second pushrod of the plurality of pushrods, to pass through the first float.

The following description and the annexed drawings set forth certain illustrative aspects of the embodiments of the disclosure. These aspects are indicative, however, of but a few of the various ways in which the principles of the disclosure may be employed and the various embodiments are intended to include all such aspects and their equivalents. Other advantages and novel features will become apparent from the following description when considered in conjunction with the drawings.

BRIEF DESCRIPTION OF THE DRAWINGS

The drawings, in which like numerals represent similar parts, illustrate generally, by way of example, but not by way of limitation, various embodiments discussed in the present document.

FIG. 5 illustrates a right view of the water level indicator of FIG. 2.

FIG. 6 illustrates a rear view of the water level indicator of FIG. 2.

FIG. 7 illustrates a left view of the water level indicator of FIG. 2.

FIG. 8 illustrates a front view of the water level indicator of FIG. 2.

FIG. 13 illustrates a front view of the upper housing of FIG. 9.

FIG. 14 illustrates a left view of the upper housing of FIG. 9.

FIG. 15 illustrates a back view of the upper housing of FIG. 9.

FIG. 16 illustrates a right view of the upper housing of FIG. 9.

FIG. 34 illustrates a side view of the top cap of FIG. 30.

FIG. 35 illustrates a front view of the top cap of FIG. 30.

FIG. 36 illustrates a side view of the top cap of another embodiment of a water level indicator.

FIG. 43 illustrates a front view of the float cage of FIG. 37.

FIG. 44 illustrates a back view of the float cage of FIG. 37.

FIG. 55 illustrates a perspective view of a embodiments of a float, float cage pushrod and indicator flag cap of a water level indicator.

DETAILED DESCRIPTION

Figure 1:
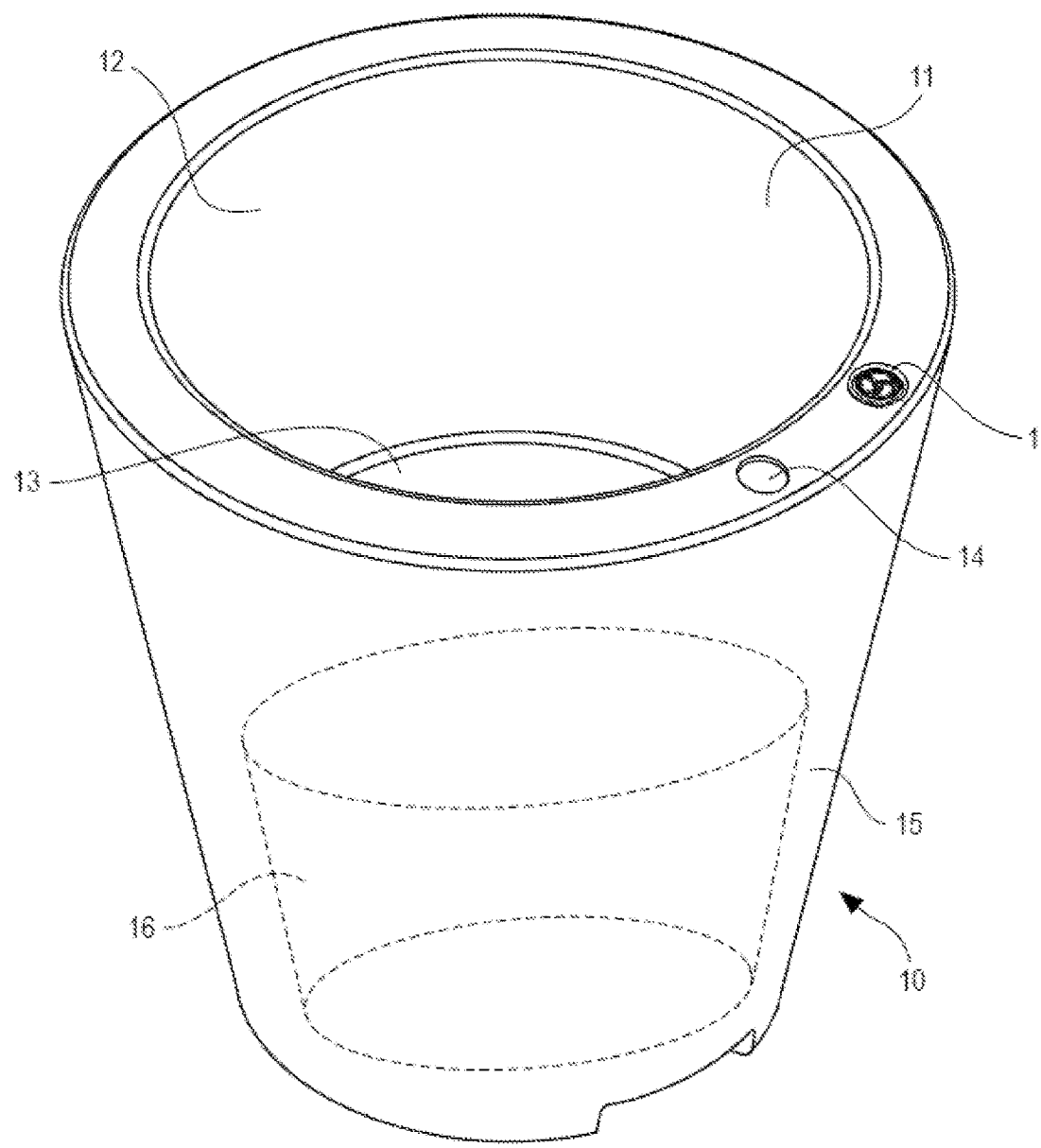
FIG. 1 illustrates a perspective view of an embodiment of a self-watering planter in accordance the disclosure.

In the following detailed description, reference is made to the accompanying drawings which form a part hereof, and in which are shown by way of illustration specific embodiments in which the subject matter disclosed herein may be practiced. These embodiments, which are also referred to herein as "examples," are described in sufficient detail to enable those skilled in the art to practice the subject matter disclosed herein. It is to be understood that the embodiments may be combined or that other embodiments may be utilized, and that structural, logical, and electrical variations may be made without departing from the scope of the subject matter disclosed herein. The following detailed description is, therefore, not to be taken in a limiting sense, and the scope of the subject matter disclosed herein is defined by the appended claims and their equivalents. In the description that follows, like numerals or reference designators will be used to refer to like parts or elements throughout. In this document, the terms "a" or "an" are used, as is common in patent documents, to include one or more than one. In this document, the term "or" is used to refer to a nonexclusive or, unless otherwise indicated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

In one embodiment, a water level indicator may have an upper housing, comprising a cavity, wherein a plurality of indicator flag caps therein. A plurality of pushrods may each have a first end and a second end to define a length that is different from the lengths of the other pushrods in the plurality of pushrods. The first end of each pushrod in the plurality of pushrods may connect to a different indicator flag cap. The water level indicator may include a plurality of floats such that each float may have a locking hole, which receives and secures a second end of one of the plurality of pushrods. A first float of the plurality of float cages may have its locking hole secure the second end of a first pushrod of the plurality of pushrods, and may further have at least one through hole which allows a second pushrod of the plurality of pushrods, to pass through the first float.

In some embodiments, the water level indicator of may have a shell. In some embodiments each of plurality of float may further include a float cage such that the locking hole in each of the floats is disposed within the float cage of each respective float. In some embodiments having a shell, the float cages of the water level indicators have a spacer that separate the sides of the float cages from the shell. In some embodiments, the upper housing further comprises locking wings. In some such embodiments, the water level indicator may also have a top cap having a window, a rim, and an outer wall, where the outer wall surrounds the upper housing. The outer wall may further have cut outs that accommodate the locking wings of the upper housing. In some embodiments the cavity may comprise a plurality of cavities in the upper housing, including a first cavity, a second cavity and a third cavity.

In some embodiments, the water level indicator may also have the at least one through hole in the first float include a first through hole and a second through hole. In some such embodiment, a first through hole of the at least one through holes in the first float, and the locking hole in the first float, may each have extension walls, such that the extension walls of the first through hole engage the first through hole in the first float, and the extension walls of the locking hole engage the second through hole in the first float. In some embodiments the extension walls of the locking hole of the first float have a floor.

In some embodiments, a self-watering planter may include an internal wall and floor defining a plant cavity, an external wall surrounding a water reservoir, and an inlet capable of allowing water to enter the water reservoir. The self-watering planter may further have a water level indicator which may have an upper housing, comprising a cavity, wherein a plurality of indicator flag caps may be disposed. A plurality of pushrods may each have a first end and a second end to define a length that is different from the lengths of the other pushrods in the plurality of pushrods. The first end of each pushrod in the plurality of pushrods may connect to a different indicator flag cap. The water level indicator may include a plurality of floats such that each float may have a locking hole, which receives and secures a second end of one of the plurality of pushrods. A first float of the plurality of floats, may have its locking hole secure the second end of a first pushrod of the plurality of pushrods, and may further have at least one through hole which allows a second pushrod of the plurality of pushrods, to pass through the first float.

In some of these embodiments, the water level indicator of may have a shell. In some embodiments each of the plurality of floats may further include a float cage such that the locking hole in each of the floats is disposed within the float cage of each respective float. In some embodiments having a shell, the float cages of the water level indicators have a spacer that separate the sides of the float cages from the shell. In some embodiments, the upper housing further comprises locking wings. In some such embodiments, the water level indicator may also have a top cap having a window, a rim, and an outer wall, where the outer wall surrounds the upper housing. The outer wall may further have cut outs that accommodate the locking wings of the upper housing. In some embodiments the cavity may comprise a plurality of cavities, including a first cavity, a second cavity and a third cavity.

In some of these embodiments, the water level indicator may also have the at least one through hole in the first float include a first through hole and a second through hole. In some such embodiment, a first through hole of the at least one through holes in the first float, and the locking hole in the first float, may each have extension walls, such that the extension walls of the first through hole engage the first through hole in the first float, and the extension walls of the locking hole engage the second through hole in the first float. In some embodiments the extension walls of the locking hole of the first float have a floor.

In some embodiments, a water level indicator may include an upper housing, having at least three cavities, including a first cavity, a second cavity and a third cavity. An indicator flag cap may be disposed within each cavity in the upper housing. At least three pushrods, including a first pushrod, a second pushrod and a third pushrod, may each have a first end and a second end defining a length that is different from the lengths of the other pushrods in the plurality of pushrods. The length of the first pushrod may be shorter than the length of the second pushrod, and the length of the second pushrod may be shorter than the length of the first pushrod. The first end of each pushrod in the plurality of pushrods may be connect to a different indicator flag cap, such that the first end of the first pushrod is connected to the indicator flag in the first cavity of the upper housing, the first end of the second pushrod is connected to the indicator flag in the second cavity of the upper housing, and the first end of the third pushrod is connected to the indicator flag in the third cavity of the upper housing. A plurality of floats may include a first float, a second float and a third float. A plurality of float cages, may include a first float cage, a second float cage and a third float cage, wherein each float in the plurality of floats is disposed within one of the plurality float cages, such that the first float is disposed in the first float cage, the second float is disposed in the second float cage, and the third float is disposed in the third float cage. Each float cage may have a locking hole, which receives and secures a second end of one of the plurality of pushrods such that the first float cage receives and secures the first pushrod in its locking hole, the second float cage receives and secures the second pushrod in its locking hole, and the third float cage receives and secures the third pushrod in its locking hole. The first float cage and a first float each may have at least two through holes which allows the second pushrod and third pushrod of the plurality of pushrods, to pass through the first float cage and the first float. The second float cage and second float may have at least one through hole, which allows the third pushrod to pass through the second float cage and the second float.

In some embodiments, a water fluid level indicator includes an upper housing having a cavity, and a plurality of indicator flag caps, including a first indicator flag cap and a second indicator flag cap. Each indicator flag cap may be disposed and movable within the cavity in the upper housing. The water fluid level indicator may also include a plurality of pushrods, including a first push rod and a second pushrod, where each pushrod substantially elongate and having an upper rod end and a lower rod end. The distance between the upper and lower rod ends defining the length of the pushrod, such that the first push rod may have a different length than the second push rod. The second pushrod has a first end and a second end defining a length that is different from the lengths of any of the other pushrods in the plurality of pushrods. The first flag cap may be connected with the first push rod at or proximate to its upper end and the second flag cap connected with the second push rod at or proximate to its upper end. The first end of each pushrod in the plurality of pushrods is connected to a different indicator flag cap in the plurality of flag caps. The water fluid level indicator may also include a plurality of float cages, including a first float cage and a second float cage, wherein each float cage comprises including a locking hole, and the first float cage including a through hole. The first pushrod may be secured within the locking hole of the first float cage, and the second pushrod may extend through the through hole of the first float cage and may be secured within the locking hole of the second float cage. The first float cage of the plurality of float cages may include at least one through hole which allows the second pushrod of the plurality of pushrods, to pass through the first float cage.

In certain embodiments, the water fluid level may further include a shell substantially enclosing the upper housing, flag caps, pushrods, and float cages. In certain embodiments, the water fluid level indicator may further include the float cages that include a spacer that separate the sides of the float cage from the shell. In certain embodiments, each of the plurality of float cages of the water fluid level indicator may further include a float disposed within the float cage. In certain embodiments, the water fluid level indicator may further include an upper housing having locking wings projecting from an outer surface of the upper housing. In certain embodiments, the water fluid level indicator may further include a top cap having a window, a rim, and an outer wall, wherein the outer wall surrounds the outer surface of the upper housing, and comprises cut outs that accommodate the locking wings of the upper housing. In certain embodiments, the water fluid level indicator may further include a cavity having a plurality of cavities, including a first cavity correspondingly, a second cavity, the first indictor flag cap disposed and movable within the first cavity and the second indicator flag cap disposed and movable within the second cavity and a third cavity.

In certain embodiments, the water fluid level indicator may further include a plurality of indicator flag caps having a third indicator flag cap, wherein the plurality of pushrods further includes a third pushrod. The third pushrod may have a different length than the first pushrod and the second pushrod. The third flag cap may be connected to the third pushrod at or proximate to its upper end. The plurality of float cages may further include a third float cage, such that the first float cage includes an additional through hole, and the second float cage includes a through hole, and wherein the third push rod extends through the additional through hole of the first float cage as well as the through hole of the second float cage, and is secured within the locking hole of the third float cage.

FIG. 1 illustrates a perspective view of a self-watering 10 planter in accordance with an embodiment. A self-watering planter 10 is depicted as an example of a liquid container in accordance with an embodiment of the disclosed concepts. The water level indicator 1 disclosed herein can be implemented in any type of liquid container. As used herein "water" or "liquid" may refer to water, an aqueous solution, or any other liquid whose level is to be measured by the water level indicator 1. The self-watering planter 10 shown in FIG. 1 may have a plant cavity or compartment 11 defined at least in parts by internal wall 12, and floor 13. An inlet 14 allows a user to deposit water or another liquid into a liquid reservoir 16 that, in the illustrated embodiment, is concentrically disposed within a portion of the outer wall 15 of the self-watering planter. The self-watering planter 10 may also have a water level indicator 1 as will be discussed in greater detail below.

The plant cavity 11 may be cylindrical, rectangular, or may have any suitable shape desired by a person of ordinary skill in the art implementing such an embodiment in accordance with the disclosed concepts. Accordingly, the internal wall 12 and floor 13 of the self-watering planter 10 may have a single section, or may comprise multiple wall or floor sections. The plant cavity 11 need not have a floor, and may be defined by the internal wall 12 alone. At least a portion of the plant cavity 11 may extend into the liquid reservoir 16, may have a porous section which allows water to enter the plant cavity and provide water to a plant located therein. The plant cavity 11 may be filled with gravel, dirt, and a plant, and any other materials, or creatures (such as worms) desired by the user of the self-watering planter. The inlet 11 allows water to an interior space within the outer wall 15 of the self-watering planter 10 and to enter the liquid reservoir 16. A cap (not shown in FIG. 1, but further described herein) may be provided to cover the inlet 14 when the inlet is not being used to refill the liquid reservoir 16. The inlet 14 may be separate from the opening which receives the water level indicator 1, as shown in FIG. 1. Alternatively, the water level indicator may 1 reside within inlet 14. The liquid reservoir 16 may have any suitable shape desired by a person implementing the disclosed concepts.

The self-watering planter may have any other features known in the art, including outlets, water overflow outlets, ribs or other internal structure to secure the water level indicator 1 or otherwise hold it in place. Such internal structure may include recesses (not shown) to receive and secure the wings 25 of the upper housing 2 of the water level indicator 1. Such recesses may be similar in shape and functionality to the cutouts 84 and locking slot 85 shown in the top cap 8 in FIG. 36. As discussed above, the water level indicator 1 may be used in connection with any liquid container, and the self-watering planter embodiment 10, is to be considered exemplary and not limiting.

FIGS. 2-8 illustrate a water level indicator in accordance with an embodiment of the disclosure. As shown in these figures, a top cap 8 and an upper housing 2 houses a plurality of indicator flag caps 3, including the illustrated embodiment of three flag caps 3a, 3b, 3c. Each indicator flag cap 3, 3a, 3b, 3c may be connected to a pushrod 6, 6a, 6b, 6c. The plurality of pushrods 6 extend beyond the upper housing, into a shell 7. The shell may also house a plurality of float cages 4, 4a, 4b, 4c, each of which may contain floats 5, 5a, 5b, 5c. Persons of ordinary skill in the art will note that the term floats 5 and float cages 4 may refer to the same object or to separate objects. A "float cage" 4 that floats may simultaneously be a float 5, and a float 5 that secures a pushrod may simultaneously be, or include, a float cage 4. A float 5 and a float cage 4 may be a unitary structure, may be separate structures, or each float 5 and float cage 4 respectively may be comprised of multiple structures. Thus a float 5 may be said to comprise a float cage 4, or a float cage 4 may be said to comprise a float 5, or they may be described separately for convenience, all within the scope of the disclosed concepts. As with other components, the description set forth here is exemplary and not intended to be limiting.

Figure 2:
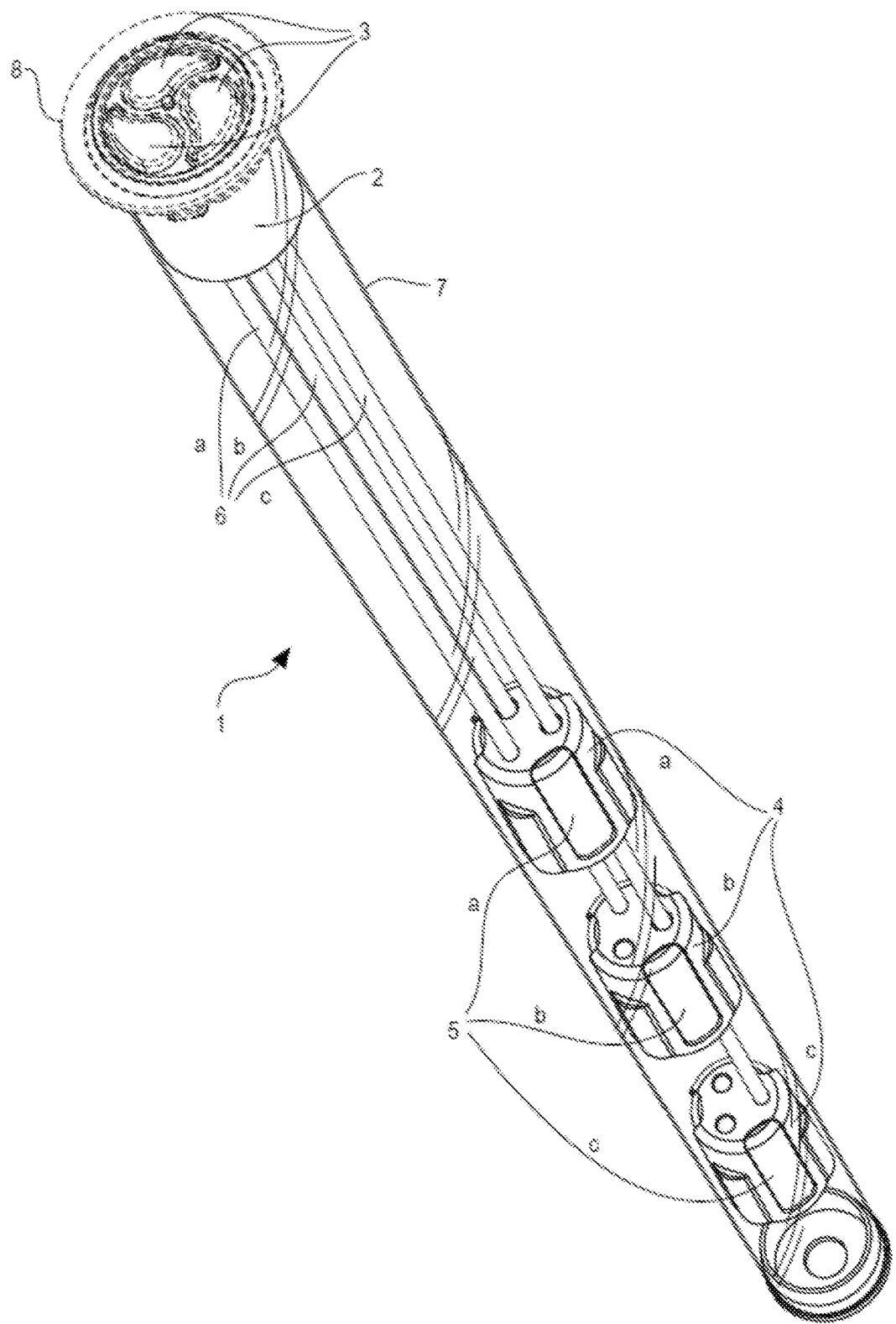
FIG. 2 illustrates perspective view of an embodiment of a water level indicator.
Figure 3:
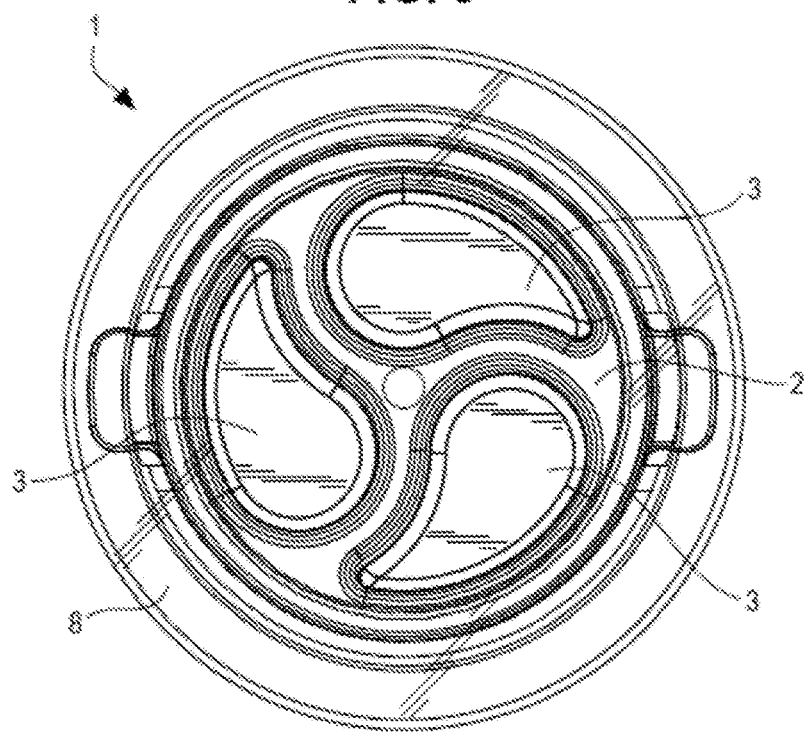
FIG. 3 illustrates a top view of the water level indicator of FIG. 2.
Figure 4:
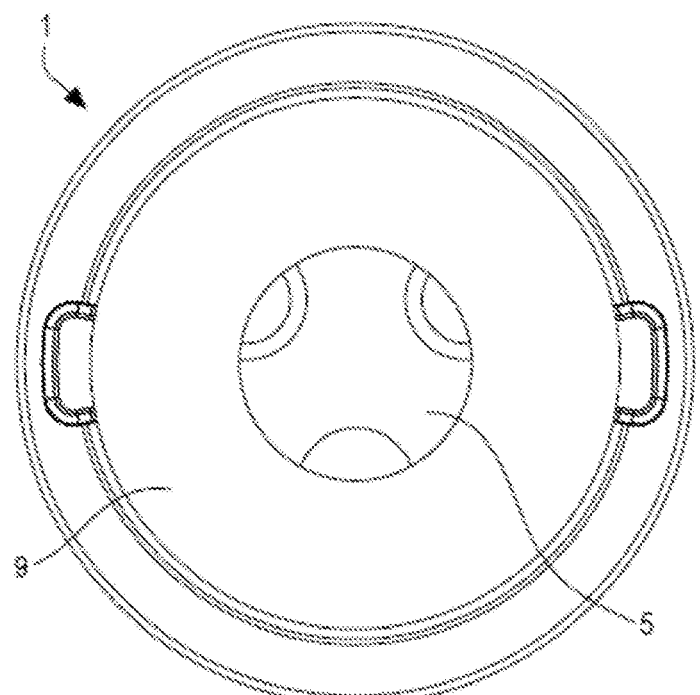
FIG. 4 illustrates a bottom view of the water level indicator of FIG. 2.

The float cages 4a, 4b, 4c may receive and secure pushrods 4a, 4b, 4c, or allow them to pass through the float cage 4 and float 5 structures. For example, as shown in FIG. 2, float cage 4a receives and secures pushrod 6a, but allows pushrods 6b and 6c to pass through float cage 4a and float 5a. In this regard, a tunnel, aperture, slot, or other structural opening may be provided such that a passing through push rod may extend beyond a far edge of its float cage 4. Also shown in the illustrated embodiment, float cage 4b receives and secures pushrod 6b, but allows pushrod 6c to pass through float cage 4b and float 5b. Further, float cage 4c receives and secures pushrod 5c. The water level indicator 1 may also include a bottom cap 9 such that bottom cap 9 and top cap 3 may be provided at opposed, longitudinal ends of shell 6.

The pushrods slidably engage the upper housing 2, such that the indicator flag caps 3 may rise and fall within the upper housing 2. Similarly, as discussed above the float cages 4, 4a, 4b, 4c may secure a pushrod 6, 6a, 6b, 6c, and may allow the other unsecured pushrods 6, 6b, 6c, to slidably pass through the float cage 4, 4a, 4b. Shell 6 may be in fluid communication with liquid reservoir 16 such that water may enter shell 6 as liquid reservoir 16 is correspondingly filled. In this manner, the water level in the liquid container 16 forces the floats and float cages up, beginning with the lowest float cage 4c and float 5c. As the water level rises, the float cage 4c and float 5c push the secured pushrod 6c upwards, which in turn pushes the connected indicator flag cap 3c upwards towards the top of the upper housing 2. As the water level continues to rise, the other float cages 4a, 4b and their floats 5a, 5b push their respective pushrods 6a, 6b, and their respective indicator flag caps 3a, 3b upwards. Accordingly, a user of the water level indictor 1 can see at a glance water level within the liquid reservoir 16 based on the number of water indicator flags that are visible at the top of the upper housing. For instance, in the exemplary embodiment shown in FIGS. 2-8, if all three indicator flags 3a, 3b and 3c are in a raised position at the top of the upper housing 2, the liquid reservoir 16 is at or nearly at 100% capacity. If only two indicator flag caps 3b and 3c are in a raised position at the top of the upper housing 2, the liquid reservoir 16 may be at least at two-thirds capacity. If only one indicator flag caps 3c is in a raised position at the top of the upper housing 2, the liquid reservoir 16 may be at least at one-third capacity. If no indicator flag caps are visible at the top of the upper housing, and thus none are in a raised position and all are in a lowered or stored position, then the liquid reservoir 16 may be at less than one third capacity. A similar fractional representation of liquid remaining in liquid reservoir 16 is contemplated should four flags be provided, where approximate 25% intervals would be represented based on the number of flags in a raised position, or if five flags are raised, where approximately 20% intervals would be represented based on the number of flags in a raised position, or any possible number of "n" flags representing 100/n % intervals.

Persons of skill in the art will also recognize each liquid flag cap need not represent an even fraction of liquid reservoir, and any desired representation may be used. For example, one indicator flag cap may signify a half full liquid reservoir 16, two may signify a three-quarters full liquid reservoir 16, and three may signify a full liquid reservoir. This can be accomplished, for instance, by uneven spacing between cages 4 and floats 5. It will be further appreciated that any desired number of indicator flag caps 3, float cages 4, floats 5, and pushrods 6 may be used in accordance with the disclosed concepts.

It should be also appreciated by one of ordinary skill in the art that the terms "top" and "bottom" do not necessarily signify associated orientation of indicator 1 with the top cap 8 elevated with respect to bottom cap 9. For instance, one of ordinary skill would appreciate that if indicator 1 was oriented such that top cap 8 was proximate to a lower end of planter or container 10, then flags 3 would move to a raised position as the liquid container 16 was emptied. Where liquid container 16 had no liquid, then all flags 3 would be in a 'raised' position, and if liquid container 16 was at or nearly at 100% capacity then all flags 3 may be in a "lowered" position. Such an inversion may be useful, for instance, to determine progress of draining liquid container 16.

In the illustrated embodiment, flags 3 are positioned in their raised position flush or nearly flush with an upper surface of top cap 8 such that they do not protrude, or at least do not substantially protrude, beyond the upper surface of cap 8.

FIGS. 9-17 illustrate an embodiment of the upper housing 2 of a water level indicator 1 in accordance with the disclosure. Upper housing 2 may have an outer surface 20, a bottom wall 28, a top surface 29 longitudinally opposed to the bottom wall, a top rim 26 proximate the top surface, and one or more cavities 21 each having an inner surface 22 and floor 23. Each cavity may have a through hole 24, which provides a passage from each of the one more cavities through the floor 23, and each through hole may have extension walls 27 extending below bottom wall 28. In some embodiments, floor 23 may be defined by bottom wall 28. The upper housing may also have wings 25, which in the illustrated embodiment a provided on outer surface 20 proximate to top rim 26. The upper housing may be made of plastic, metal or any other suitable material or combination of materials known in the art.

The upper housing 2 may be cylindrical in shape, as shown in FIGS. 9-17, or alternatively a rectangular shape or, indeed, any other suitable shape desired by a person implementing the disclosed concepts. Similarly, the cavities 21 may have a teardrop shape, as shown in FIGS. 9-17, or be circular, rectangular, or any other suitable shape desired by a person implementing the disclosed concepts. As shown in FIGS. 9-17, the cavities 21 may be consistently shaped, evenly spaced and arranged in radially symmetric fashion. Alternatively, the cavities 21 may each have a different shape, and may be arranged in any desired fashion and with any desired spacing. The floor 23 and extension walls 27 of each cavity may be optional, as the through hole 24 may have the same shape and size as the cavity 21. The cavities may have stopping structures (not shown) to prevent the indicator flag caps 3 that they may house from rising beyond the top surface of the cavity or from falling below the bottom wall of the cavity. Alternatively, the same functionality can be accomplished without stops in embodiments where the inner surface of the cavity may be smaller at the top of the upper housing than it is towards the bottom of the cavity. The through hole 24 and extension walls 27 of the upper housing may be dimensioned to slidably receive the pushrods 6 to allow the pushrods 6 to raise or lower the indicator flag caps 3 housed within the cavity 21 depending on the water level in the liquid reservoir 16. As discussed above any desired number of cavities, may be included in upper housing 2. Alternatively, the upper housing 2 may contain more than one indicator flag cap 3 within a single cavity, and the disclosed concepts can be implemented with a single cavity housing the plurality of indicator flag caps.

Figure 9:
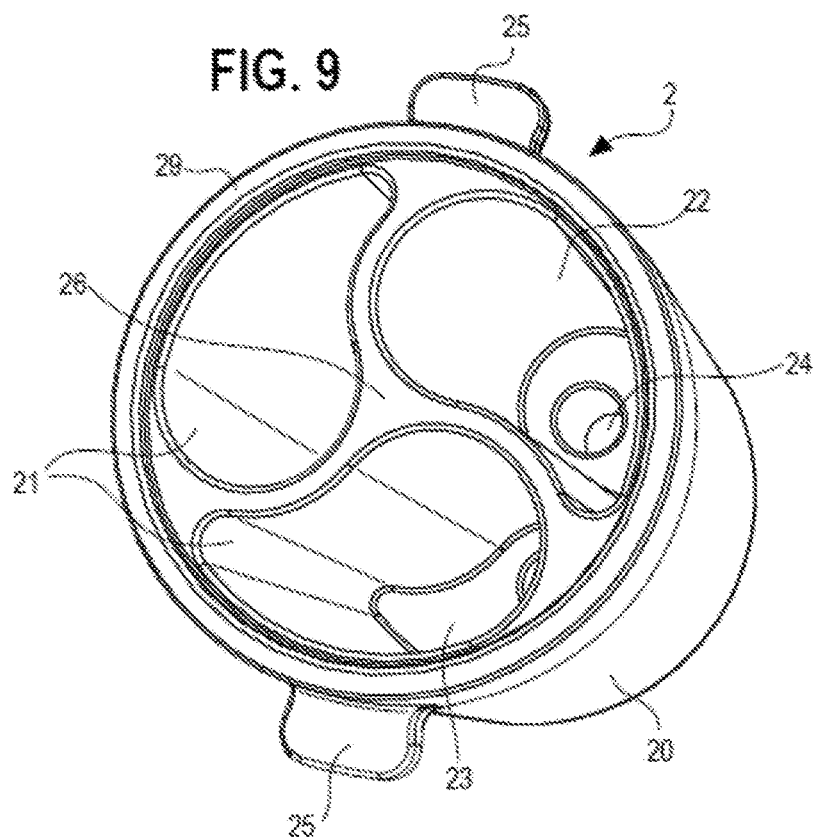
FIG. 9 illustrates a perspective view from above of an embodiment of a upper housing of a water level indicator.
Figure 10:
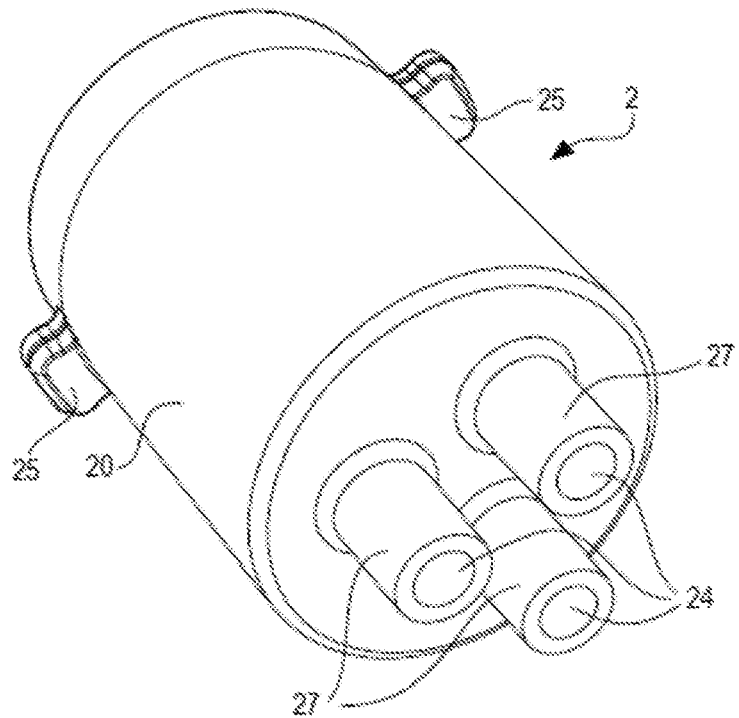
FIG. 10 illustrates a perspective view from below of the upper housing of FIG. 9.
Figure 11:
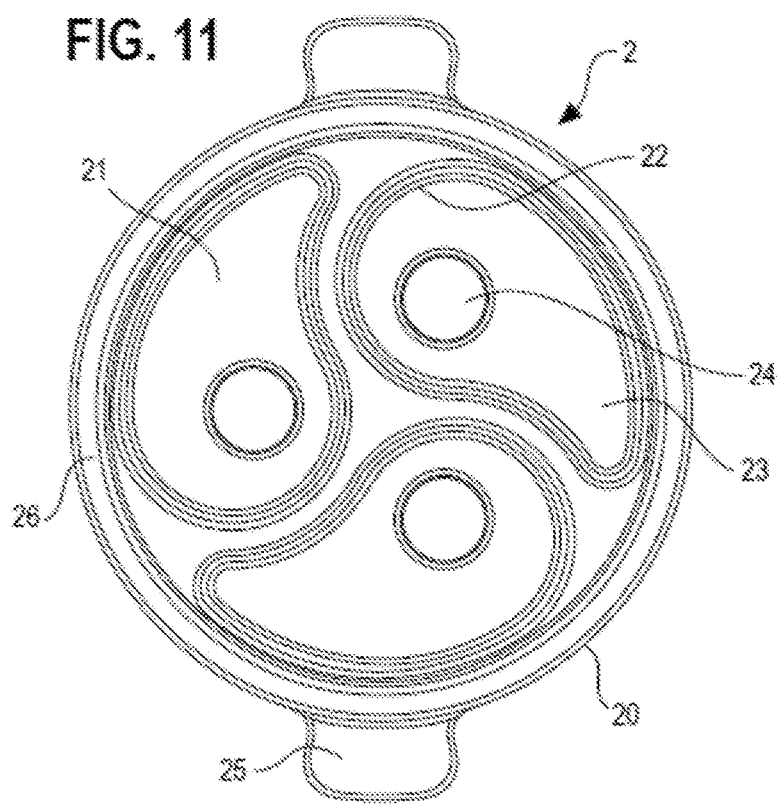
FIG. 11 illustrates a top view of the upper housing of FIG. 9.
Figure 12:
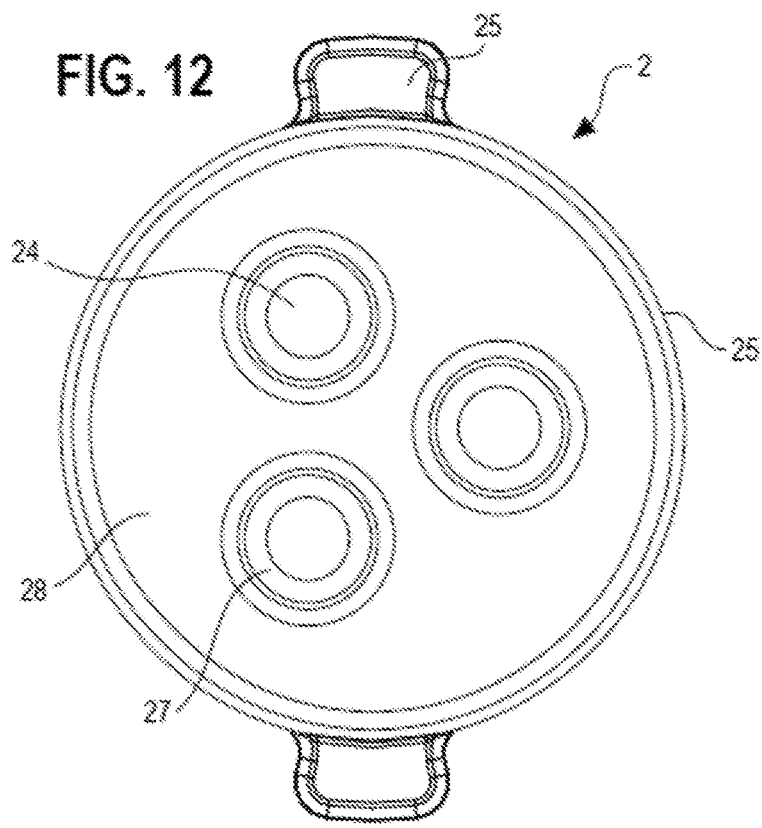
FIG. 12 illustrates a bottom view of the upper housing of FIG. 9.
Figure 17:
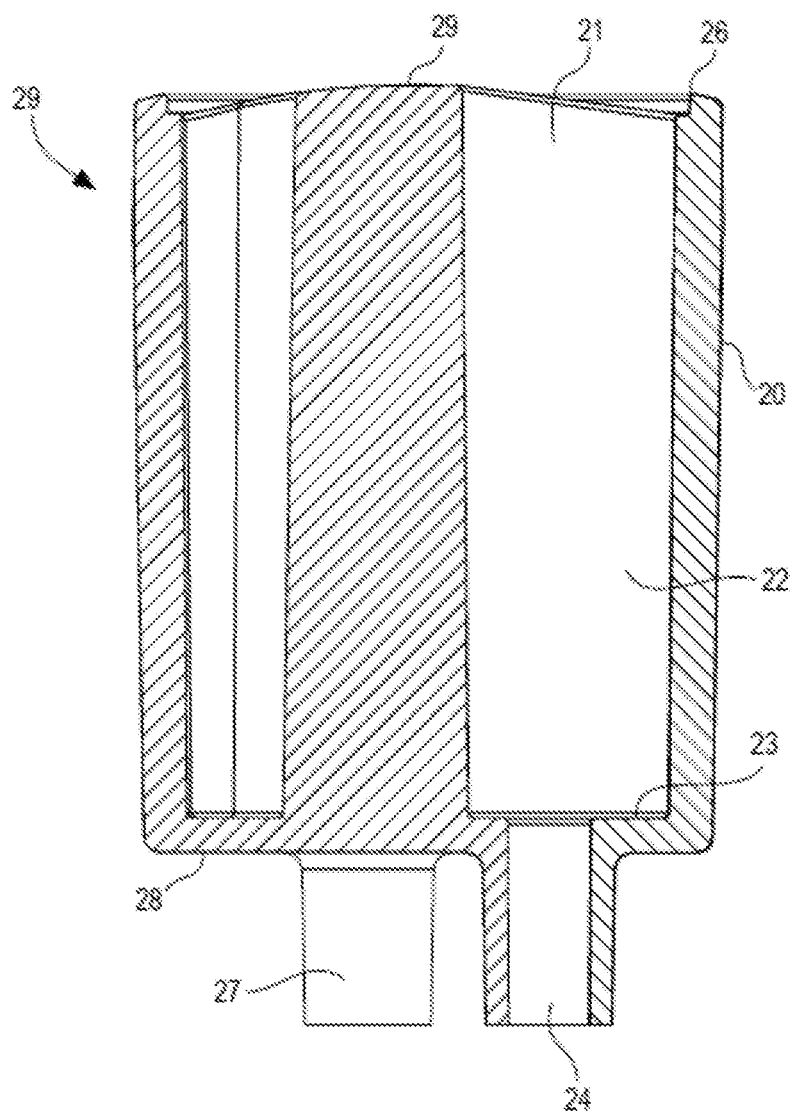
FIG. 17 illustrates a cross-sectional view from the right side of the upper housing of FIG. 9.
Figure 18:
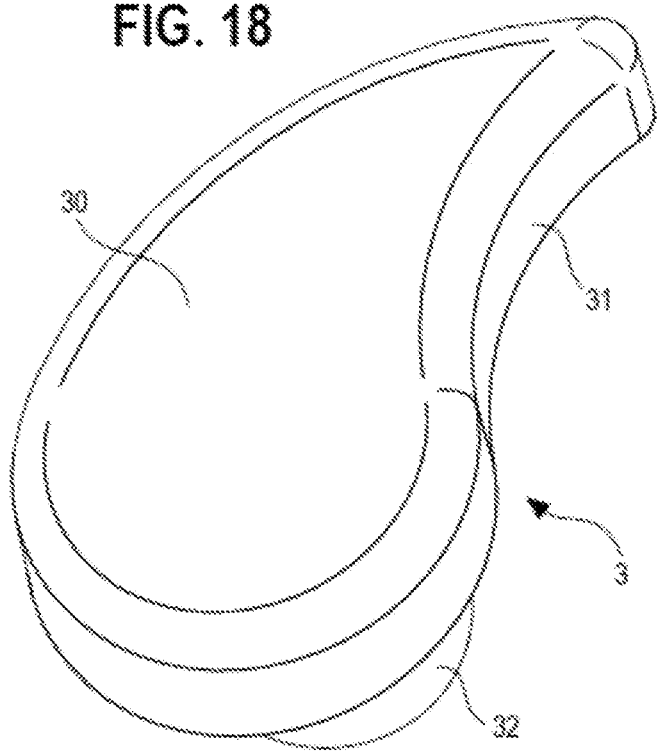
FIG. 18 illustrates a perspective view from above of an embodiment of an indicator flag cap of a water level indicator.
Figure 19:
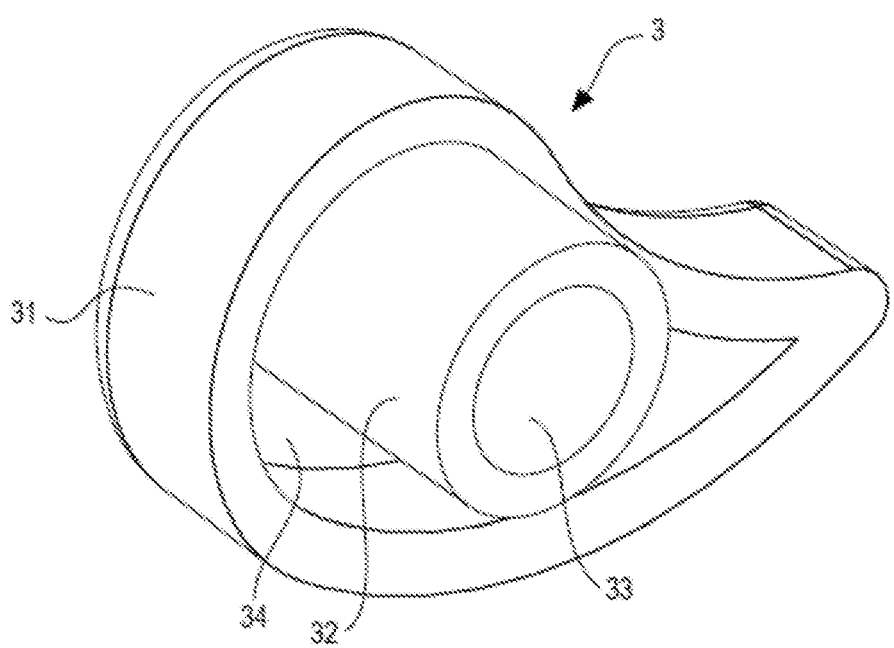
FIG. 19 illustrates a perspective view from below of the indicator flag of FIG. 18.
Figure 20:
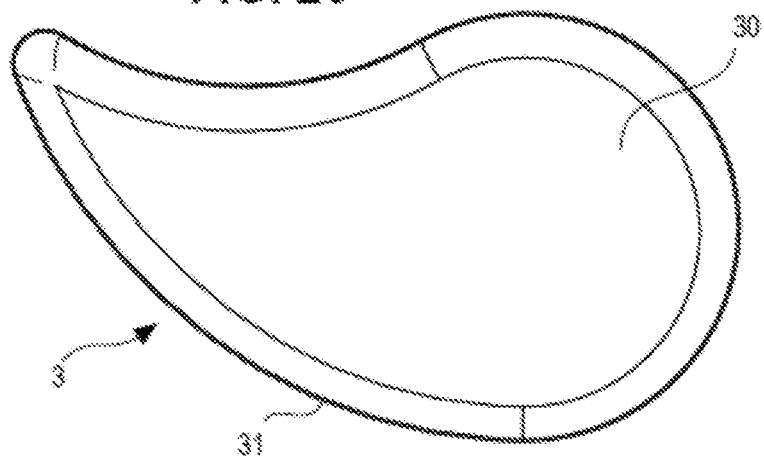
FIG. 20 illustrates a top view of the indicator flag cap of FIG. 18.
Figure 21:
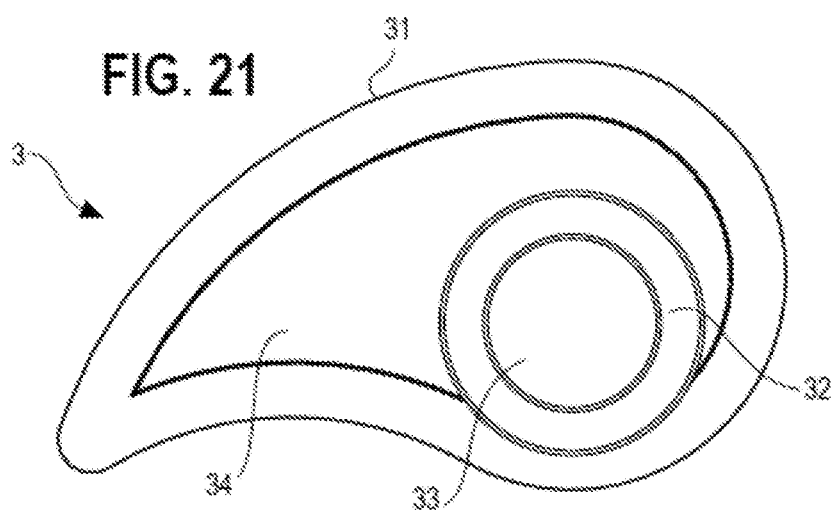
FIG. 21 illustrates a bottom view of the indicator flag cap of FIG. 18.

The wings 25 of the upper housing may be used to secure the upper housing 2 and/or the water indicator 1 as a whole to the self-watering planter 10 or other liquid container as discussed above, or to secure the top cap 8 or shell 7, as discussed below. Optionally, the top rim 26 may be elevated above the adjacent portions of the top surface 29, as shown in FIGS. 9 and 11. Top surface 29 may also optionally be shaped to have a highest point in the center which may rise above the top rim 26, as shown in FIGS. 9 and 13-17. The outer surface 20 may have a greater width or diameter at near the top of the upper housing than at the bottom of the upper housing to facilitate securing the shell 7 to the upper housing 2.

FIGS. 18-25 illustrate an embodiment of indicator flag cap 3 of a water level indicator in accordance the disclosure. The indicator flag cap may have a top surface 30, a side wall 31, an extension wall 32, a locking hole 33, and an inner cavity 34. The indicator flag cap 3 may be made of plastic, metal, or any other suitable material or combination of materials known in the art.

Figure 22:
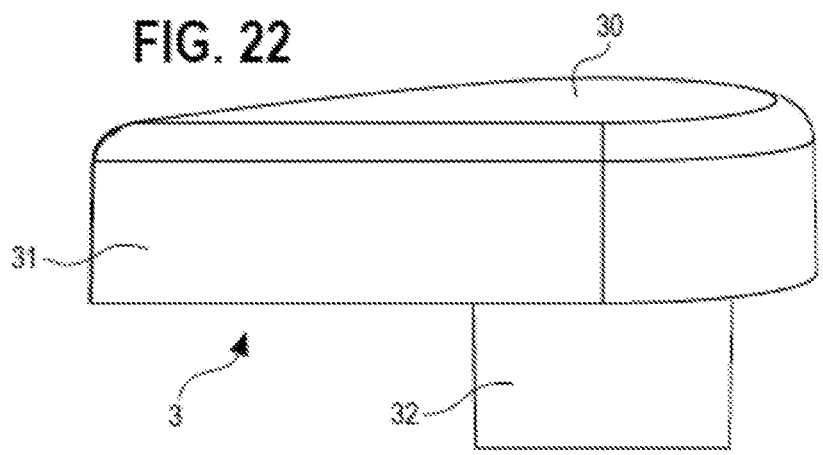
FIG. 22 illustrates a front view of the indicator flag cap of FIG. 18.
Figure 23:
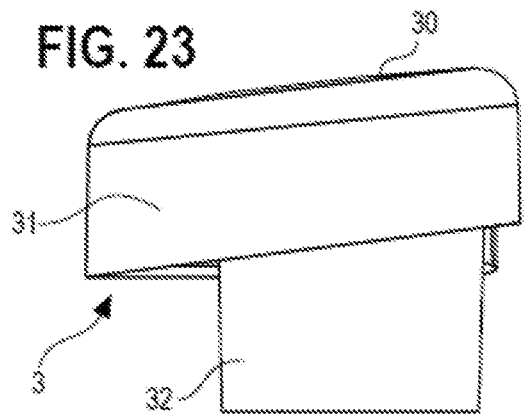
FIG. 23 illustrates a right view of the indicator flag cap of FIG. 18.
Figure 24:
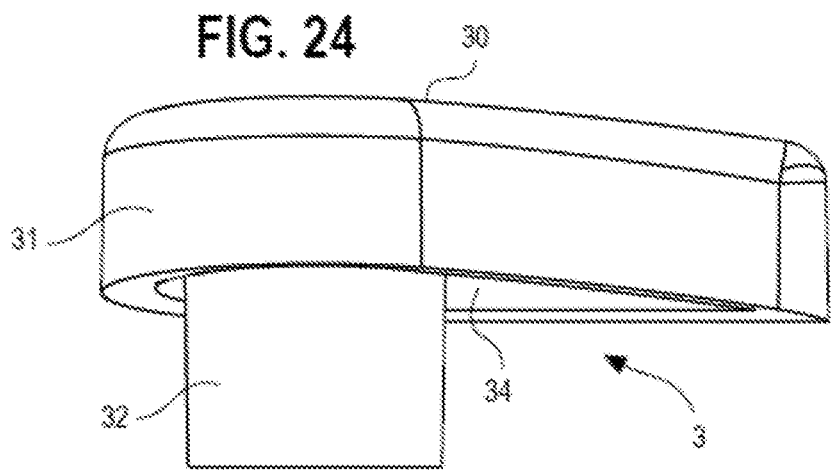
FIG. 24 illustrates a back view of the indicator flag cap of FIG. 18.
Figure 25:
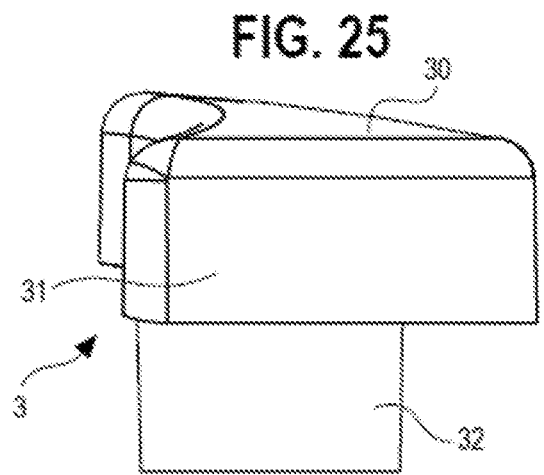
FIG. 25 illustrates a left view of the indicator flag cap of FIG. 18.

As discussed above with respect to the cavities, the indicator flag caps 3 may have a teardrop shape as shown in FIGS. 18-25, may be cylindrical, rectangular, or may have any other suitable shape desired by a person implementing the disclosed concepts. The top surface 30 of the indicator flag cap 3 should be sized so that it can be easily observable when the indicator flag cap 3 is pushed to the top of the upper housing 2. As shown in FIG. 22, the edges of the top surface may be rounded or chamfered. As shown in FIGS. 22 and 23, the top surface may be sloped, or it may be flat, or have any suitable surface that can be observed when the indicator flag cap is pushed to the top of the upper housing. The side wall 31 is optional, and may also have any suitable shape and size. Accordingly, the side wall may be unitary or may comprise a plurality of sections. The extension wall 32 is also optional, may be unitary, or may comprise a plurality of sections. The extension wall 32 may extend beyond the side wall 31, or may reside within the side wall 31. The extension wall may define a locking hole 33 for receiving and securing a first end of a push rod 6. Alternatively, a push rod 6 may also be secured to the outer surface of the extension wall 32. The pushrod 6 may be secured to the locking hole 33 or to the extension wall 32 by any method known in the art, including without limitation, through the use of adhesives, friction fit connections, or detents and recesses. The indicator flag cap 3 may have an inner cavity 34 between the side wall 31 and the extension wall 32. This can save on cost by reducing the amount of material needed to make the indicator flag cap 3, and reducing its weight.

In alternative embodiments (not shown), the locking hole 33 may simply be a located in a bottom surface of the indicator flag cap, obviating the need for an extension wall or an inner cavity. The indicator flag caps 3 may also have features to restrict its range of motion such that it does not rise beyond the top of the upper housing 2. Any such features known in the art may be used, including without limitation, shaping and sizing the indicator flag caps 3 and the upper housing 2 so that the flags cannot exit the cavities 21 of the upper housing 2, or through the use of detents and recesses. Persons of skill in the art will recognize that numerous variations and alterations can be made to the structure of the indicator flag cap 3 within the scope of the disclosed concept.

The indicator flag cap 3 may be made as a unitary structure with the pushrod 6. This unitary structure may also include the float cage 4 and/or float 5. In such embodiments, the indicator flag cap 3 may have a structure similar to that shown in FIGS. 18-25, or it may simply be the top surface of the pushrod 6. Persons of skill in the art will recognize that numerous variations and alterations can be made to the structure of the indicator flag cap 3, the pushrod 6, the floats 5 and float cages 4 within the scope of the disclosed concept, including without limitation combining one or more of them into unitary structures or keeping their respective structures separate.

Figure 26:
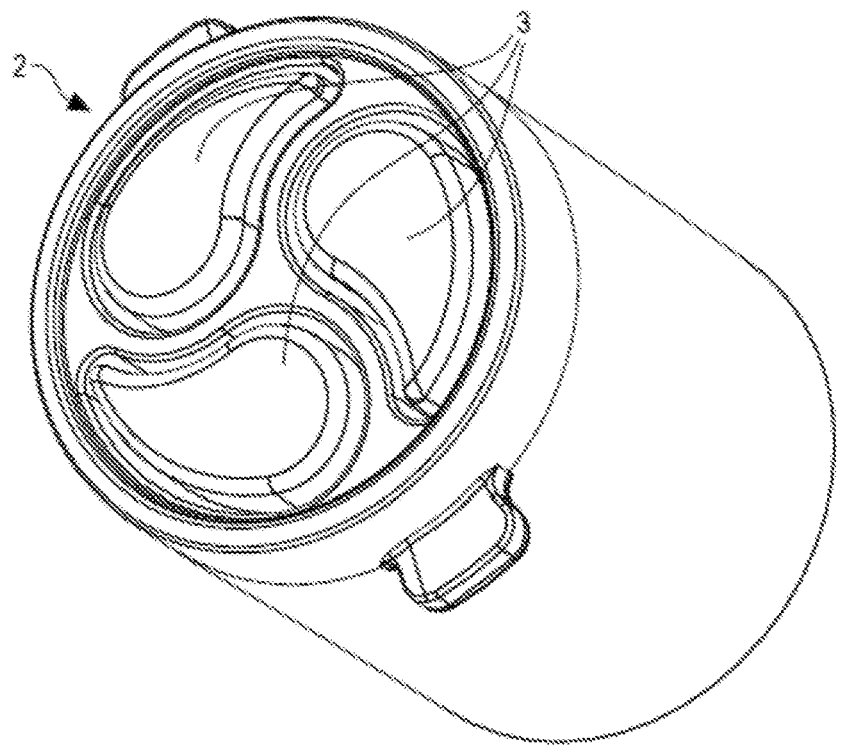
FIG. 26 illustrates a perspective view from above of an embodiment of an upper housing of a water level indicator, with three indicator flags shown in a raised position.
Figure 27:
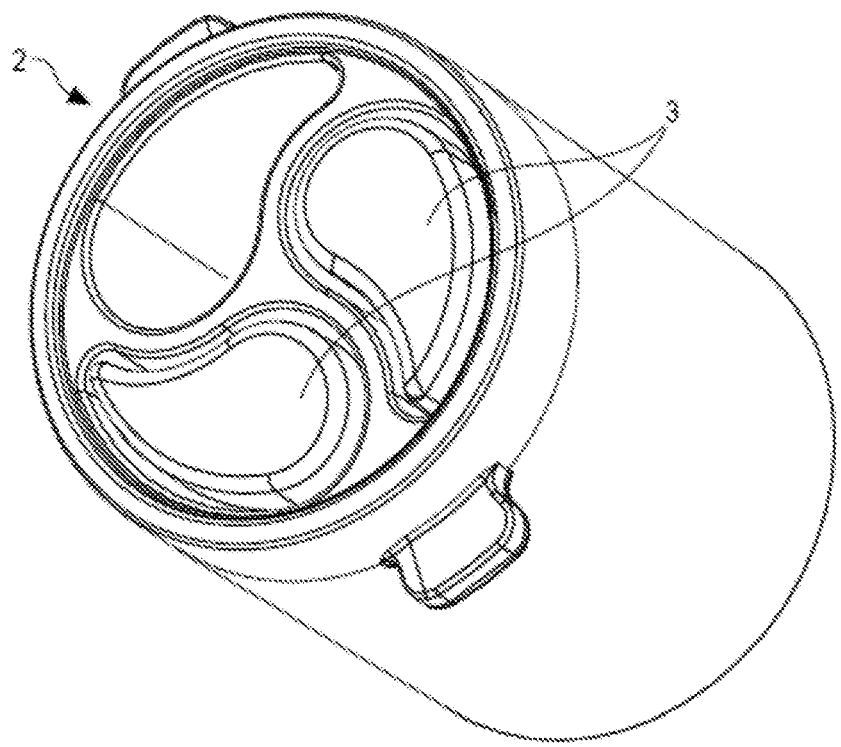
FIG. 27 illustrates a perspective view from above of an embodiment of an upper housing of a water level indicator, with two indicator flags shown in a raised position.
Figure 28:
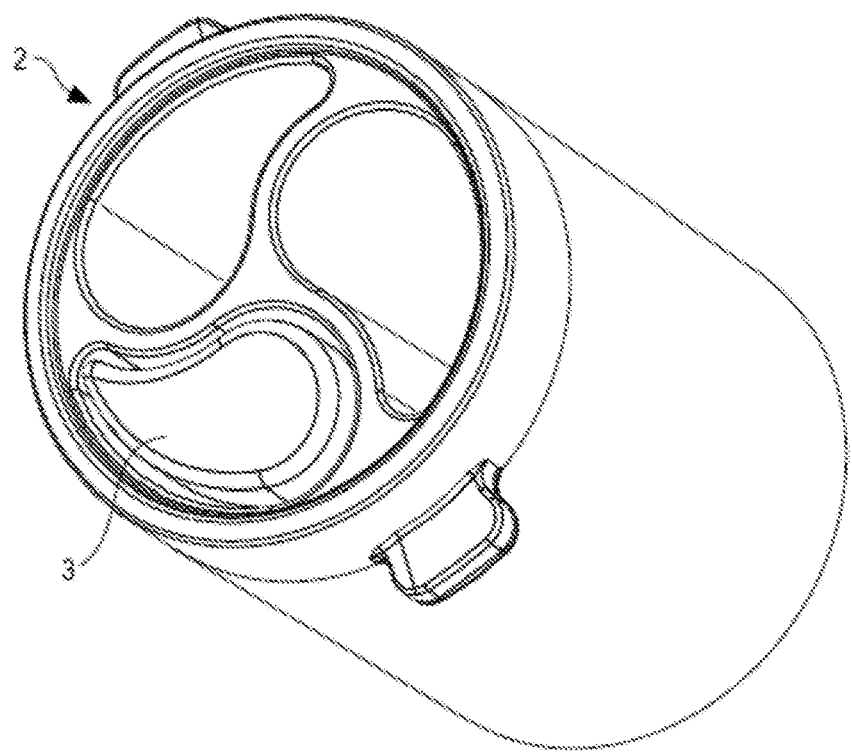
FIG. 28 illustrates a perspective view from above of an embodiment of an upper housing of a water level indicator, with one indicator flag shown in a raised position.
Figure 29:
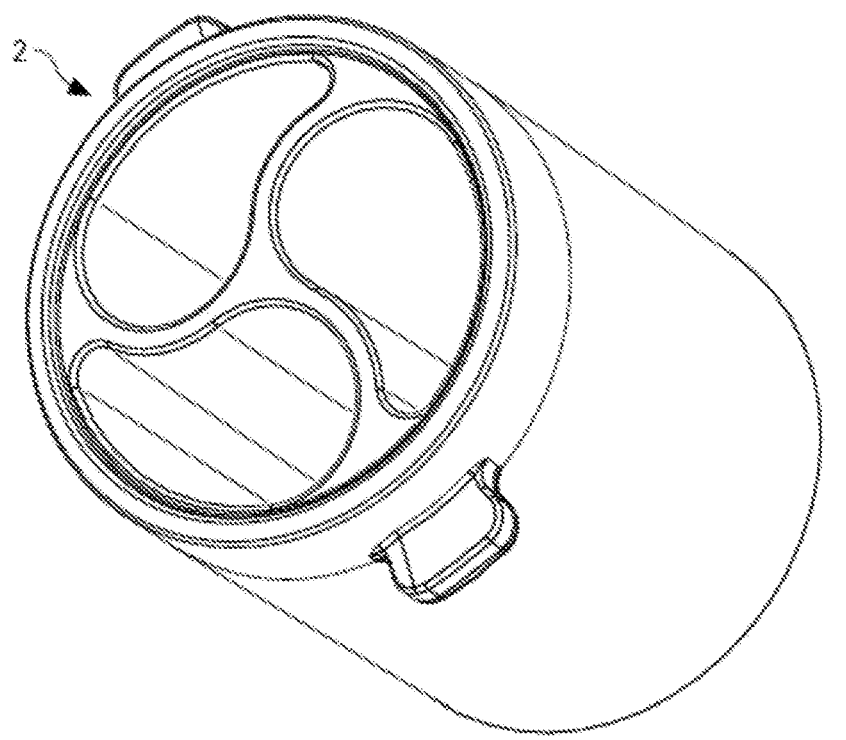
FIG. 29 illustrates a perspective view from above of an embodiment of an upper housing of a water level indicator, with no indicator flags shown in a raised position.
Figure 30:
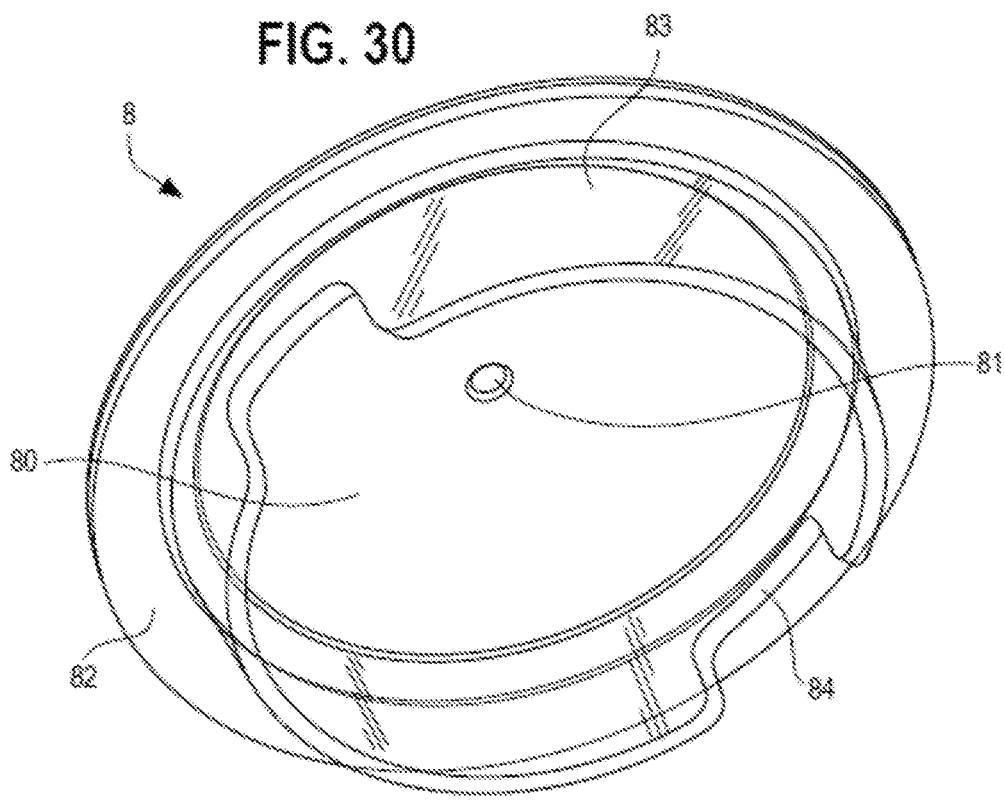
FIG. 30 illustrates a perspective view from above of an embodiment of a top cap of a water level indicator.
Figure 31:
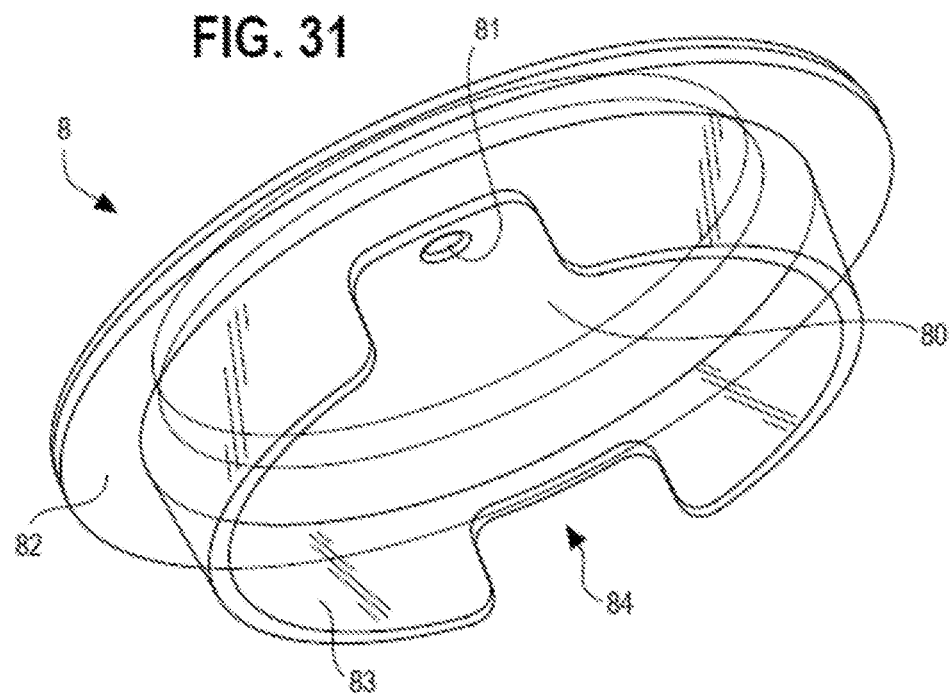
FIG. 31 illustrates a perspective view from below of the top cap of FIG. 30.
Figure 32:
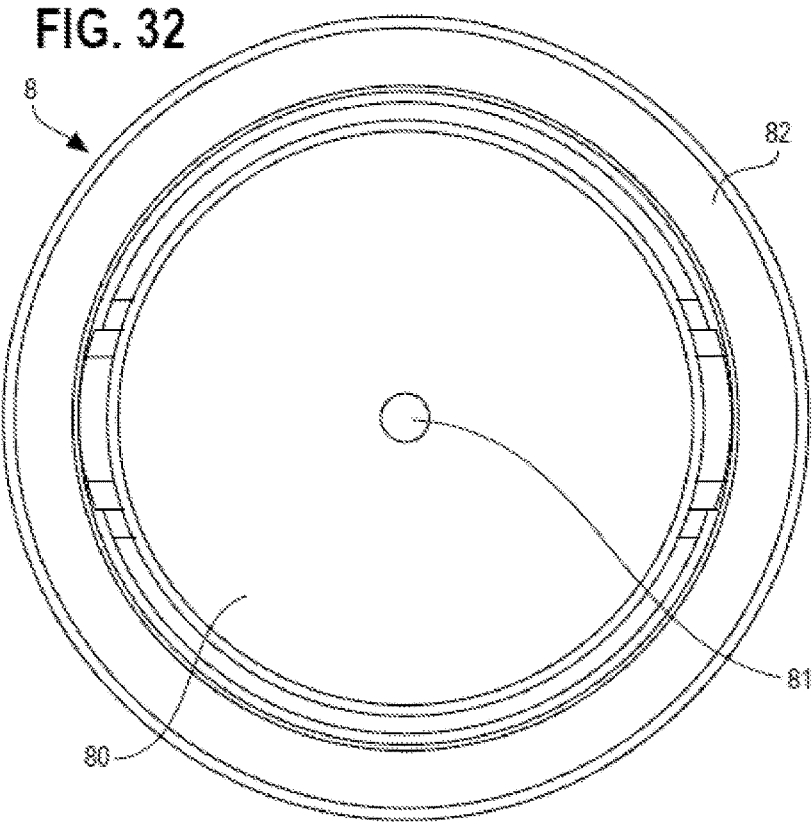
FIG. 32 illustrates a top view of the top cap of FIG. 30.
Figure 33:
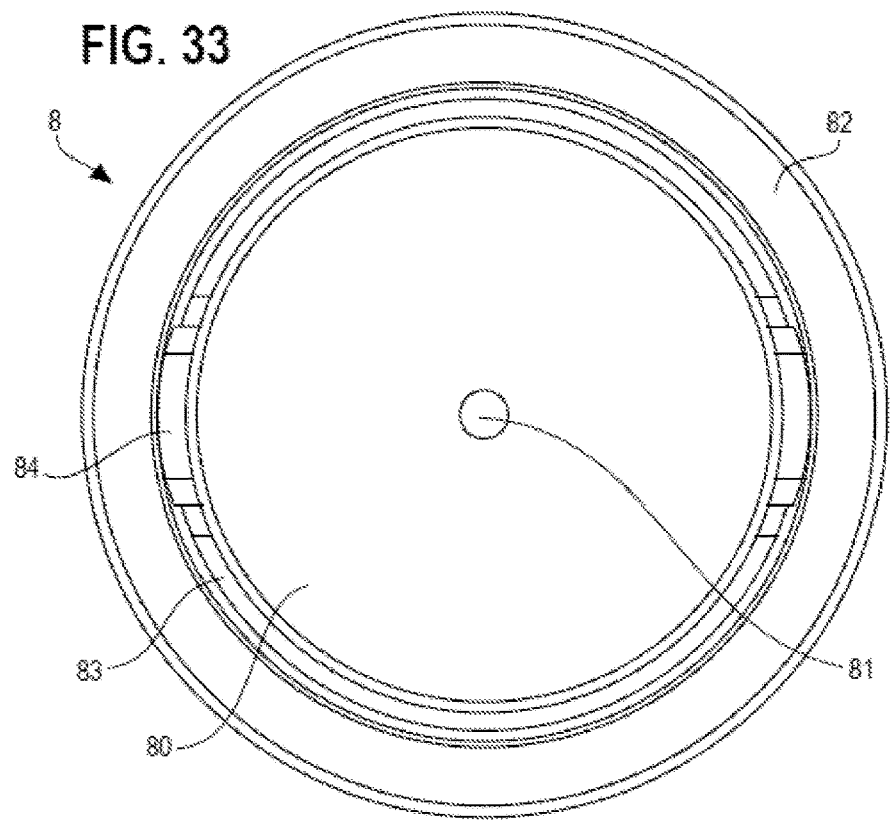
FIG. 33 illustrates a bottom view of the top cap of FIG. 30.
Figure 37:
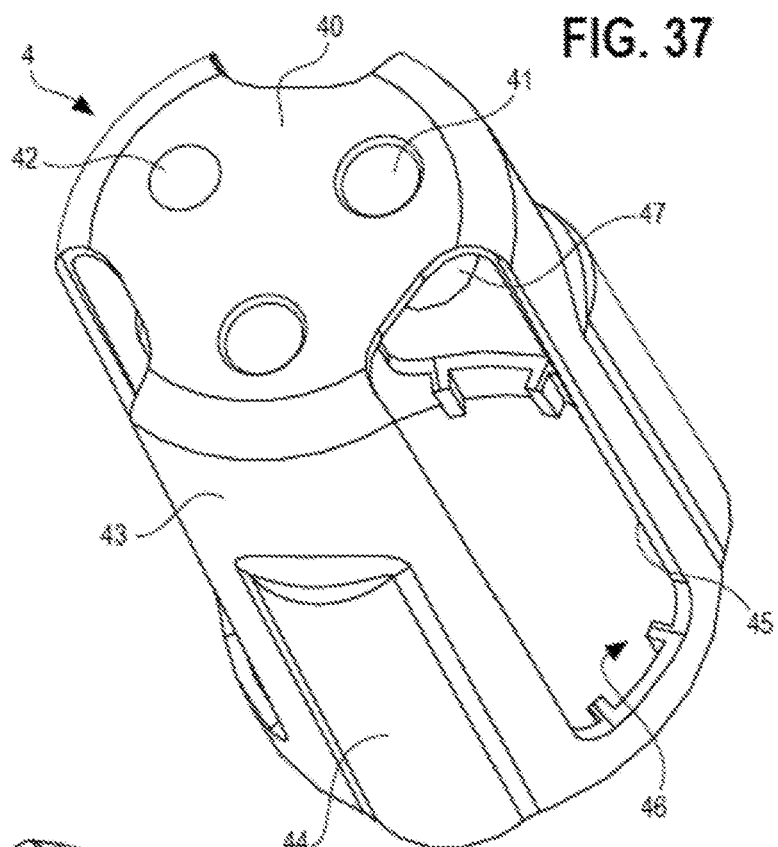
FIG. 37 illustrates a perspective view from above of an embodiment of a float cage of a water level indicator.
Figure 38:
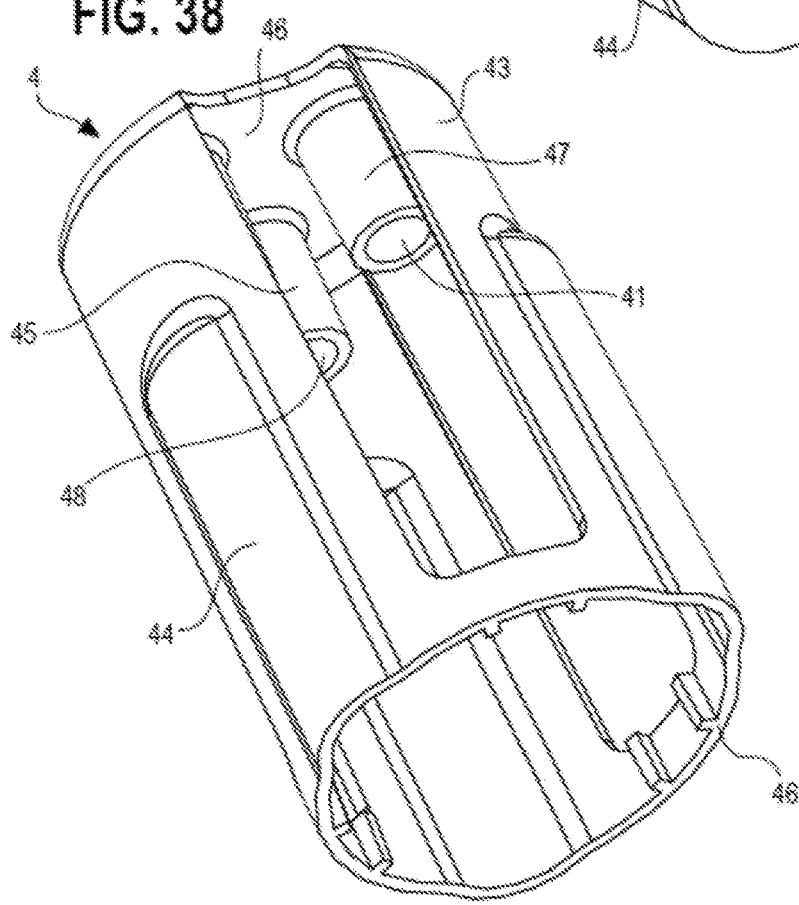
FIG. 38 illustrates a perspective view from below of the float cage of FIG. 37.
Figure 39:
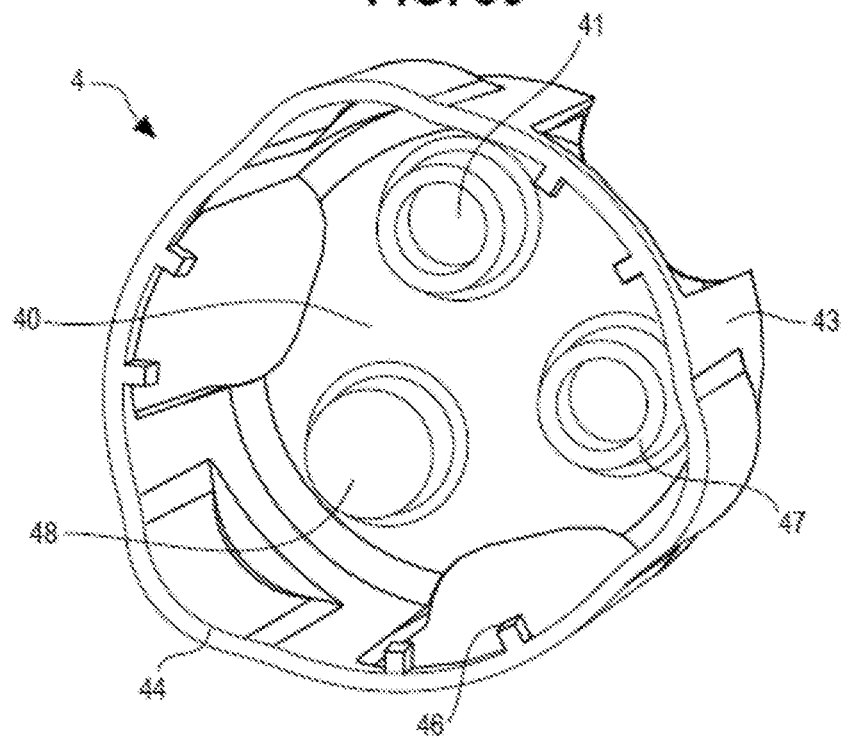
FIG. 39 illustrates a perspective view from below of the float cage of FIG. 37.
Figure 40:
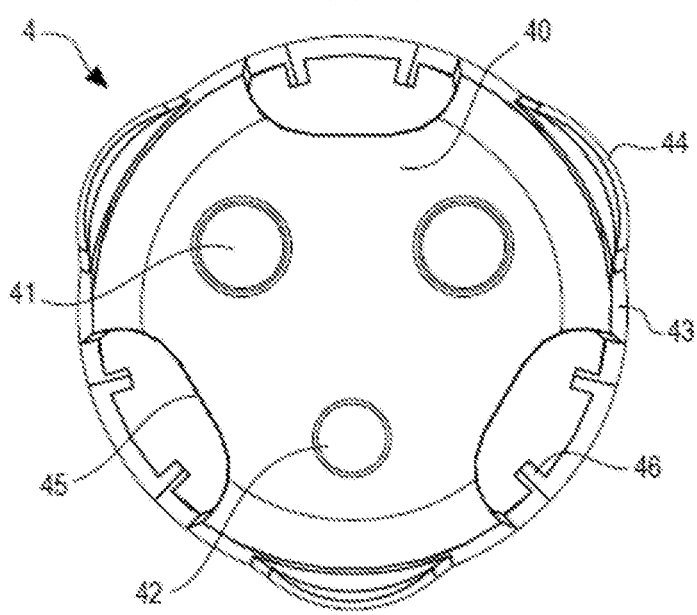
FIG. 40 illustrates a top view of the float cage of FIG. 37.
Figure 41:
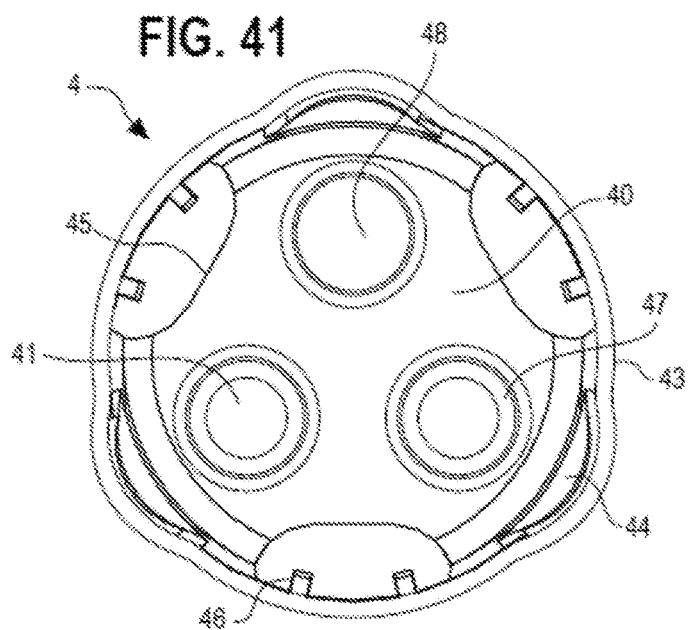
FIG. 41 illustrates a bottom view of the float cage of FIG. 37.
Figure 42:
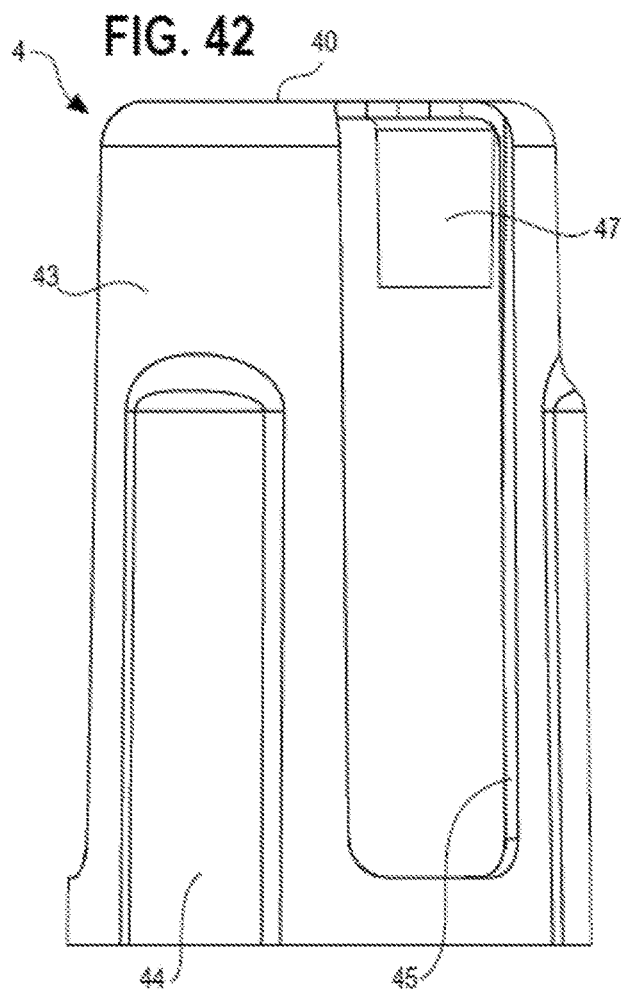
FIG. 42 illustrates a side view of the float cage of FIG. 37.

FIGS. 26-29 illustrate an embodiment of upper housing of a water indicator flag caps in the cavities. FIG. 26 shows all three indicator flag caps in view in a raised position at the top of the upper housing. As discussed above, this occurs when the water level is high enough to push all of the float cages 4 and pushrods 6 up enough for the indicator flag caps 3 to be visible in this manner. FIG. 27 shows only two indicator flag caps 3 in a raised position and visible at the top of the upper housing 2, which occurs when the water level is not high enough to push the float cage 4 with the shortest pushrod 6 up enough for its indicator flag cap 3 to show in the upper housing 2. FIG. 28 shows only one indicator flag cap 3 in a raised position and visible at the top of the upper housing 2, which occurs when the water level is not high enough to push the float cage 4 with the intermediate pushrod 6 up enough for its indicator flag cap 3 to show in the upper housing 2. FIG. 27 shows no indicator flag caps 3 visible at the top of the upper housing 2, which occurs when the water level is not high enough to push the float cage 4 with the longest pushrod 6 up enough for its indicator flag cap 3 to show in the upper housing 2. As discussed above, any number of indicator flag caps 3 may be used in accordance with the disclosed concepts.

FIGS. 30-36 illustrate an embodiment of top cap 8 of a water level indicator 1 in accordance with the disclosure. The top cap 8 may have a window 80, an outlet 81, a rim 82, a side wall 83, and a cut out 84. The top cap 8 may be made from plastic, glass, or any other material suitable or combination of materials known in the art.

As discussed above with respect to the upper housing 2, the top cap 8 may have a circular, or rectangular shape, or any other desired suitable shape. The top surface of the top cap 8 comprises a window 80 which may be sufficiently transparent or translucent to allow a user to observe the indicator flags 3 in the upper housing 2 through the window 80. The outlet 81 is optional and may be located anywhere on the top cap 8. It allows air to move in and out of the water level indicator as the indicator cap flags 3 move up or down. The rim 82 may be transparent, translucent or opaque, and may cover the area where the water level indicator connects to the self-watering planter 10 or other liquid container. The rim 82 may have a width (or diameter) that is greater that than that of the upper housing 2. The width (or diameter) of the rim 82 may also extend beyond the outer edge of the wings 25 of the upper housing. Side walls 83 may surround and receive the upper housing 2. As discussed above the side walls 83 may have any suitable shape, and may have a shape that is complementary to the shape of the upper housing 2. The side wall 83 may be a unitary structure, or may comprise several sections. The side wall 83 may have one or more cutouts 84, which are sized to accommodate the wings 25 of the upper housing 2. In some embodiments, the cut out may have a locking slot that is sized to receive and secure the wings 25 of the upper housing in order to secure the top cap to the upper housing. In this regard, cap 8 may be rotated such that wings 25 would engage adjacent locking slots.

Persons of skill in the art will recognize that a top cap 8 that is smaller than, and fits within the rim of the upper housing 2 may also be used within the scope of the disclosed concepts. Such embodiments may have an upper housing 2 that has internal structure, such as detents or other known structures, to secure the top cap within the upper housing. The top cap 8 cap may be detachable, or a person implementing the disclosed concepts may permanently attach the top cap 8 to the upper housing 2 through the use of adhesives, threading, or other known securing methods and structures.

FIGS. 37-46 illustrate an embodiment of a float cage 4 of a water level indicator 1 in accordance with the disclosure. The float cage 4 may have a top surface 40, having through holes 41, a locking hole 42, an side wall 43, spacers 44, cutouts 45, float securing structures such as projections 46, and extension walls 47 which may include a cage floor 48. The float cage 4 may be made of metal, plastic, wood, or any other suitable material. The float cage 4 may house a single float 5, or a float made of multiple sections, or may itself act as and be integrated with the float, if it is made of a material that floats in water or the liquid contained in the self-watering planter 10 or other liquid container.

Figure 46:
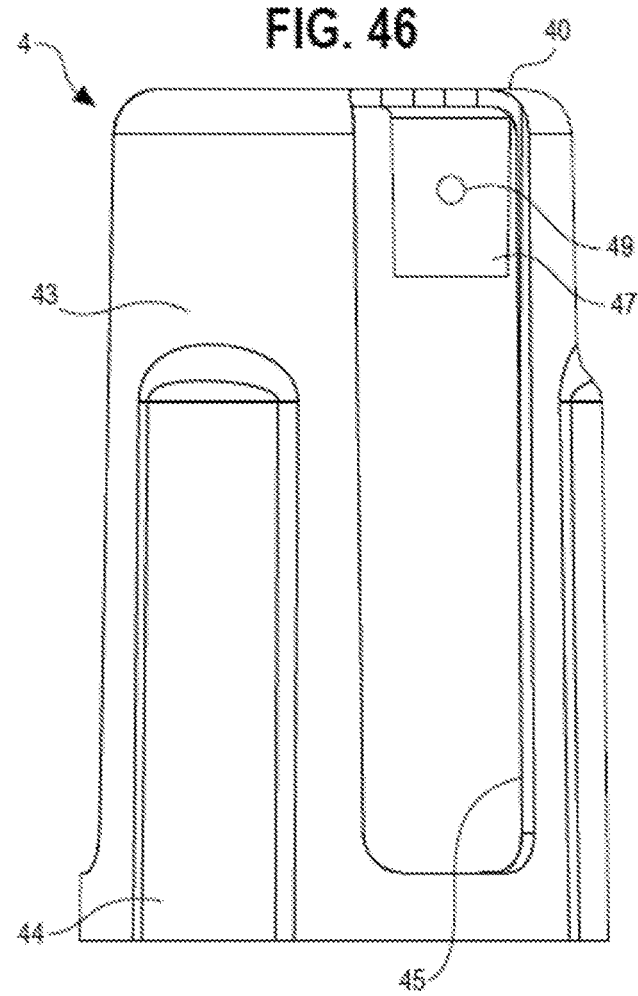
FIG. 46 illustrates a side view of a float cage of another embodiment of a water level indicator.
Figure 47:
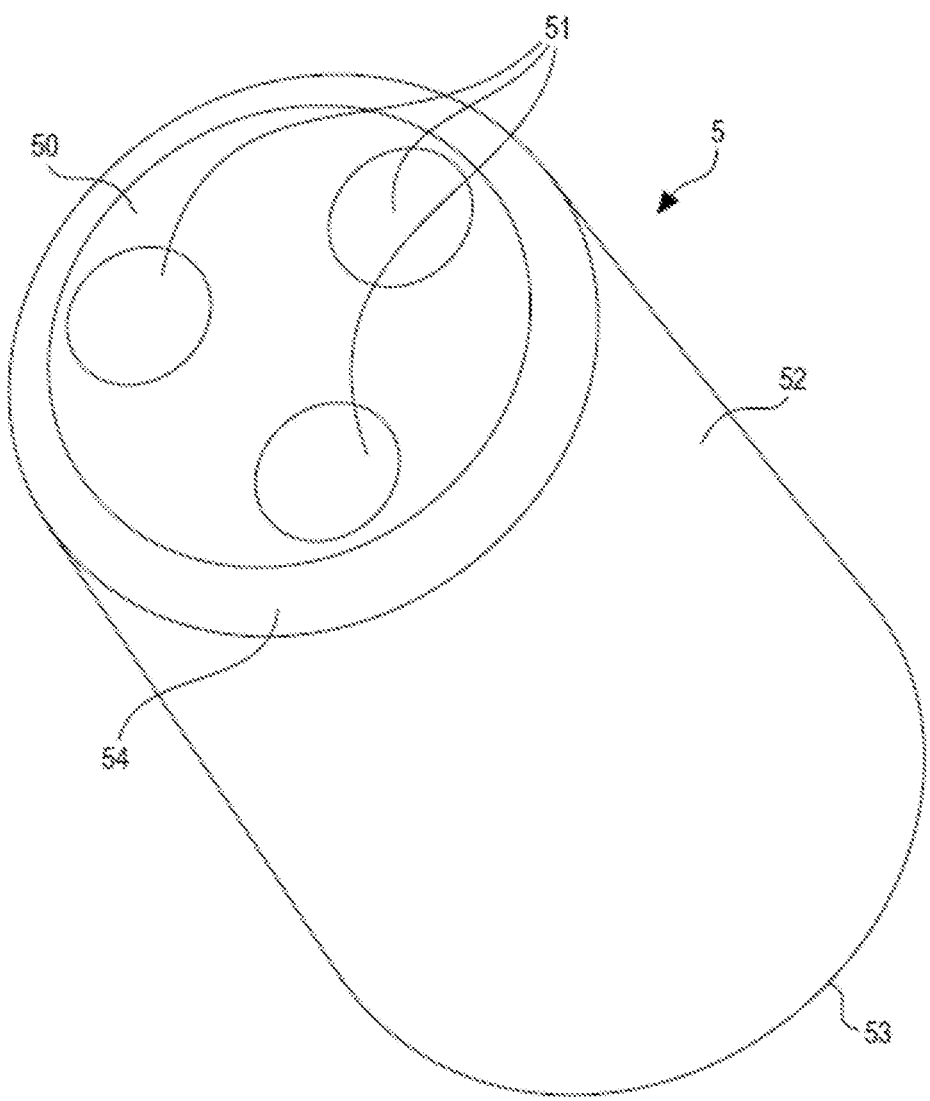
FIG. 47 illustrates a perspective view from above of an embodiment of a float of a water level indicator.
Figure 48:
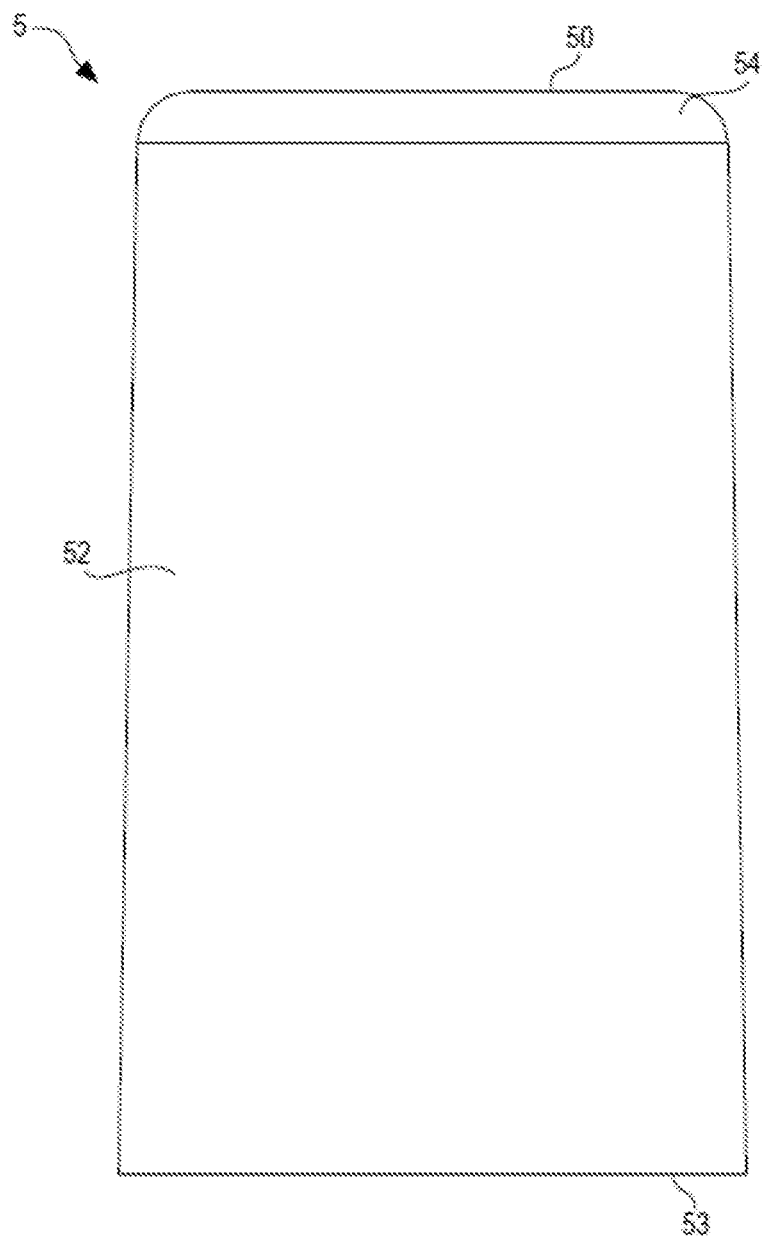
FIG. 48 illustrates a side view of the float of FIG. 47.
Figure 49:
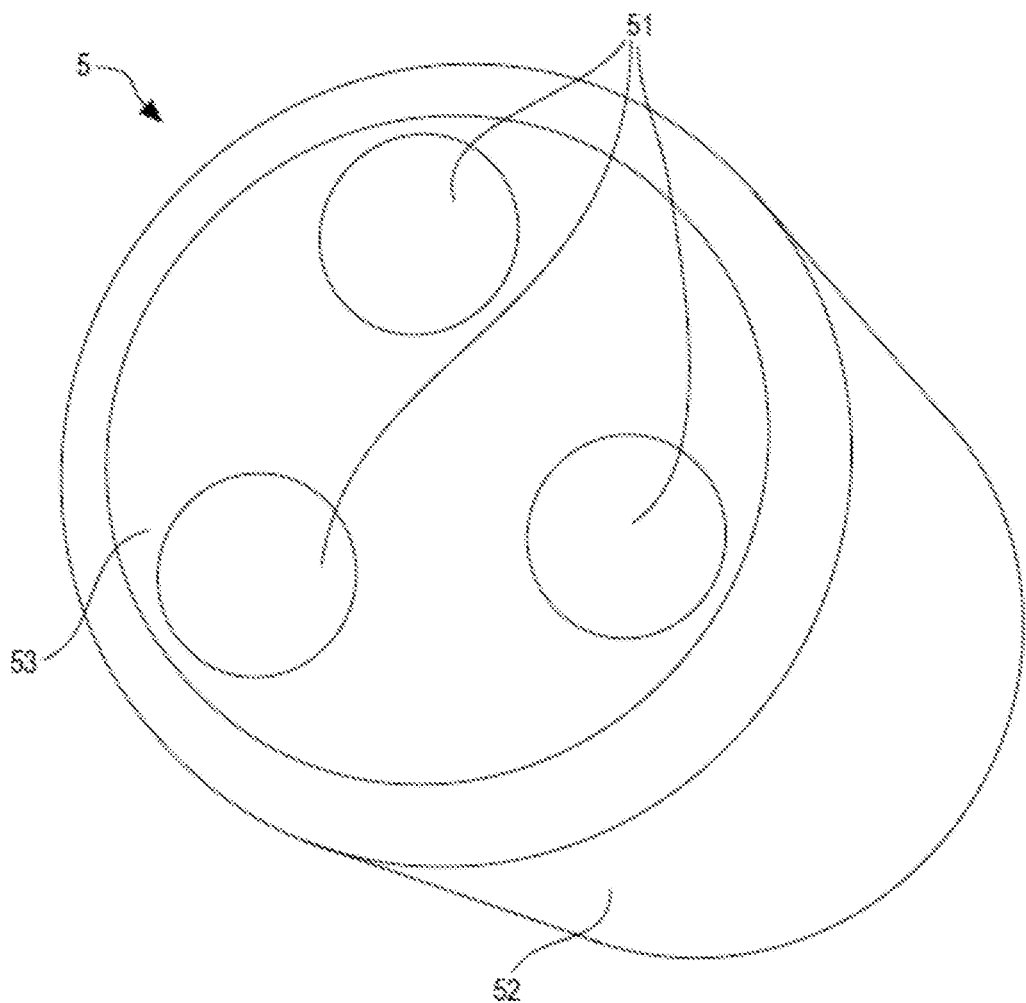
FIG. 49 illustrates a perspective view from below of the float of FIG. 47.
Figure 50:
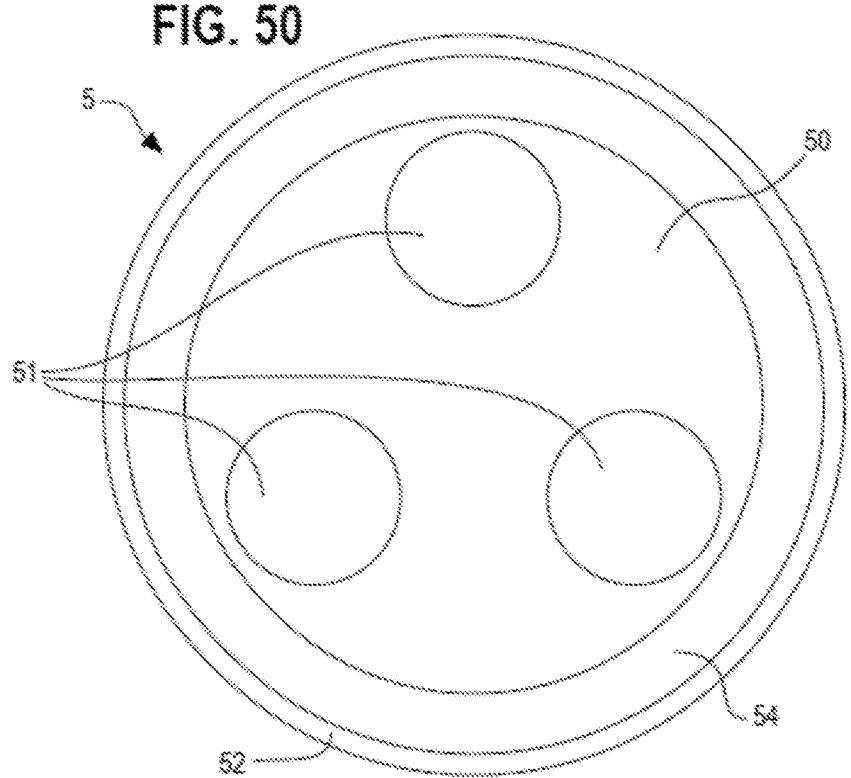
FIG. 50 illustrates a top view of the float of FIG. 47.
Figure 51:
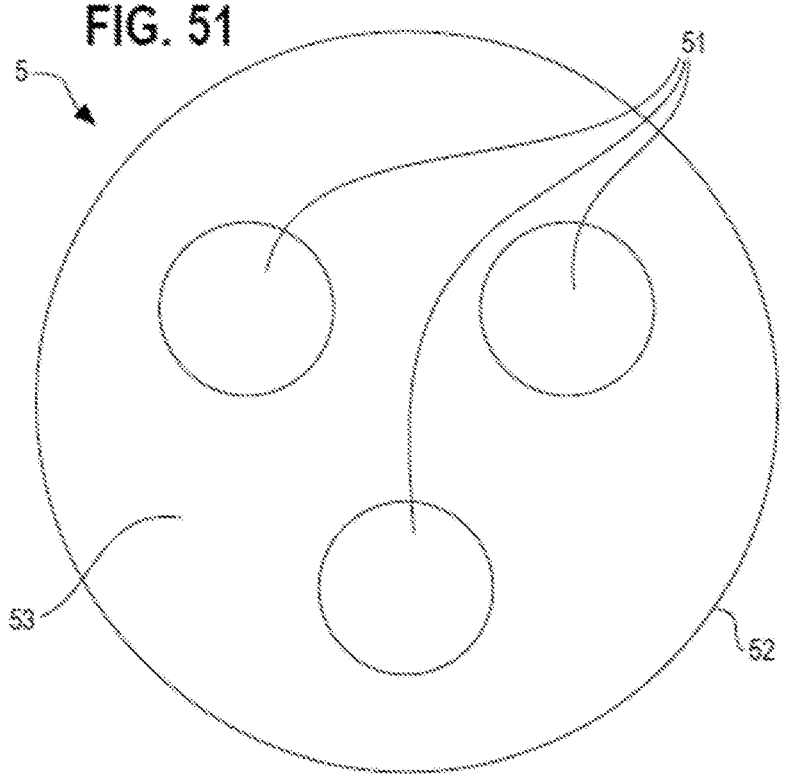
FIG. 51 illustrates a bottom view of the float of FIG. 47.

The float cage 4 may be generally cylindrical, rectangular, or have any other desired suitable shape. The top surface 40 of the float may have through holes 41 which allow pushrods to slidably pass through the float cage 4. The through hole 41 may be sized to have a width (or diameter) greater than the width (or diameter) of the pushrod 6 in order to allow the pushrod 6 to slidably move through the through hole 41. In some embodiments the top surface may be absent, and the through hole may fill the entire space defined by the sidewall 43. A single through hole 41 may also be sized to allow multiple pushrods to pass through it. The top surface may also have a locking hole 42 that receives and secures the second end of a pushrod 6. The locking hole 42 may secure the pushrod 6 through the use of adhesives, a friction fit connection, detents and recesses, or any other method for securing such structures known or to be developed in the art. FIG. 46 shows an alternative embodiment where the extension wall 47 descending from the on the locking hole 41 has a securing hole 49 which can receive a pin, or in the pushrod 6. Persons of skill in the art will recognize that numerous ways that the pushrod 6 can be secured to the locking hole 42 of the float cage 4 are contemplated within the scope of the disclosed concept. As discussed above, in embodiments where the pushrod 6 and the float cage 4 are a unitary structure, the locking hole 42 is not needed. Extension walls 47 may descend from either through-holes 41 or locking holes 42. The extension walls may be sized to receive and/or secure the through holes in floats 5 that are inserted into the float cage. Extension walls 47 descending from a locking hole 42 may have a floor 48. The float cage may also have a float securing structure, such as projections 46, or any other such structure known in the art. Projections 46 may secure the bottom floor 53 of the float 5 to keep the float 5 within the side wall 43 of the float cage 43.

The side wall 43 of the float cage may be sized to receive and house the float 5, and to slidably pass through the shell 7. The side wall may have spacers 44 built into it, or added to its outer surface to separate the main body of the side wall 43, the float cage 4, and/or the float 5 from contacting the shell 7. The spacers 44 may be rounded, edged, projections, or have any other suitable shape or structure. The float cage 4 may also have cutouts 45 to reduce the amount of material needed for the float cage 4, the weight of the float cage 4, and/or to better accommodate the float 5. In an alternative embodiment, the sidewall 43 may be internal to the floats, and have them arranged along the outer sides of the side wall 43. In other embodiments the side wall 43 may act as the float 5, if it is made of a material that floats in water or any other liquid in the self-watering planter 10 or other liquid container. While the float 5 is described separately below, persons of skill in the art will recognize that the float 5 may be part of the float cage 4, forming an integrated or even a unitary structure with the float cage 4. Accordingly, a locking hole 42 of a float cage 4 may be disposed in float 5, within the scope of the disclosed concept.

Figure 45:
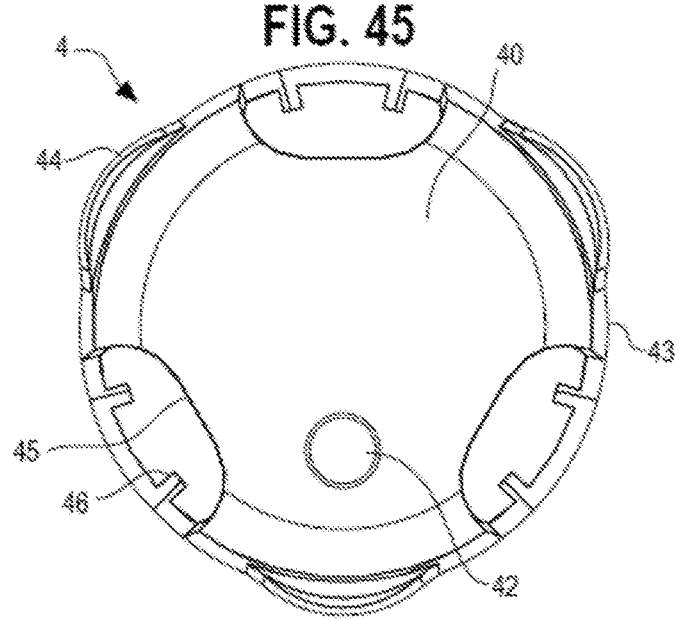
FIG. 45 illustrates a top view of the float cage of another embodiment of a water level indicator.

To save costs, and a lower the number of different pieces, all of the float cages of the water level indicator 1 may be identical, as shown in FIGS. 2-8 and 37-44. Alternatively, as shown in FIG. 45, the bottom float cage 4, which secures the longest pushrod 6 in the water level indicator does not need through holes 41, and unnecessary through holes may be removed from the other float cages 4.

FIGS. 47-51 illustrate a float 5 of a water level indicator in accordance with an embodiment of the invention. The floats 5, 5*a*, 5*b*, 5*c* may have an upper surface 50, through holes 51, an outer surface 52, and a bottom surface 53. In some embodiments the upper surface may have a tapered portion 54 which is chamfered or rounded so as to be narrower than the width or diameter of the outer surface to facilitate insertion into a float cage 4. The float may be made from wood, Styrofoam, or any other suitable buoyant material or combination of materials that floats in the liquid that is contained in the liquid reservoir 16.

The through holes 51 may be sized to allow the pushrods 6 to slidably pass through the float. Holes 51 may be uniformly sized or, in other embodiments, having differing sizes particularly. For instance, a one hole 51 may be smaller than the other holes so as to accommodate a friction fit of one push rod 6, while the other holes are larger to accommodate the other push rods 6 to pass through and remain slidable within their respective hole 51. In some embodiments the through holes 51 may be sized to receive the extension walls 47 of the float cage 4. In some such embodiments the through holes 51 of the float 5 may secure the extension walls 47 of the float cage 4 via a friction fit connection, or through any other securing method known in the art. To the extent a through hole 51 is securing an extension wall 47 descending from a locking hole, 42 of the float cage 4 and having an extension floor 48, such a through hole 51 may, but need not, extend through the entirety of the float 5. The bottom surface 53 of the float 5 may engage securing projections 46 in the float cage 4. The width or diameter of the outer surface float 5 may be consistent, or as shown in FIGS. 47-51, may be greater at the bottom than the width or diameter at the top of the float. Persons of skill in the art will recognize that the floats may be generally cylindrical, rectangular, or have any other suitable shape. Likewise, each float 5*a*, 5*b*, 5*c* may have the same shape as the other floats, or each float may have a different shape. For example as shown in FIGS. 2 and 47-51, each float 5, 5*a*, 5*b*, 5*c* may have the same number of through holes even though the lower floats do not need to allow as many pushrods to pass through them. Such an embodiment can help save on manufacturing cost and use less different components because the floats are interchangeable. Alternatively, each float may have only the number of through holes that it requires to allow the necessary pushrods 6 through or to secure the necessary number of extension walls. Persons of skill in the art will recognize that a float may have multiple through-holes, such as one for each pushrod that passes through, or may have a single through-hole allowing all such pushrods to pass through within the scope of the disclosed concepts.

Persons of skill in the art will also recognize that the each float 5, 5*a*, 5*b*, 5*c* may be a unitary construction or may comprise multiple discreet float sections within the scope of the disclosed concept. Persons of skill in the art will recognize that the through hole in such embodiments may be the empty space between the parts of the float 5 which allow the pushrods to pass through. Persons of ordinary skill in the art will recognize that the disclosed concepts can also be implemented with the floats encompassing or surrounding the float cage, instead of secured within the float cage, as shown in FIGS. 2-8 and 55. Again, in such embodiments, the through hole in the float 5 may be the empty space between the float sections, even where the float sections are exclusively located outside of the float cage 4.

Figure 54:
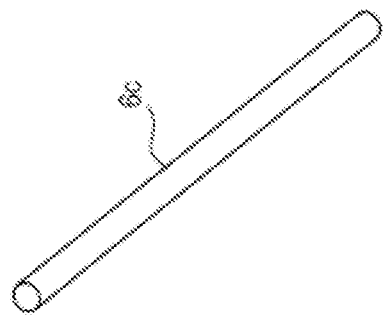
FIG. 54 illustrates a perspective view of an embodiment of a short pushrod of a water level indicator.
Figure 53:
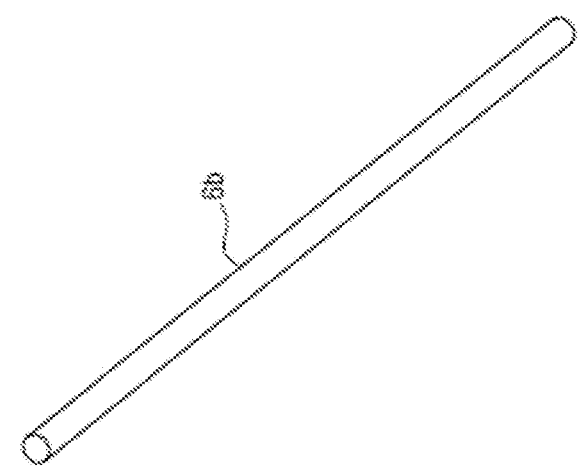
FIG. 53 illustrates a perspective view of an embodiment of a medium pushrod of a water level indicator.
Figure 52:
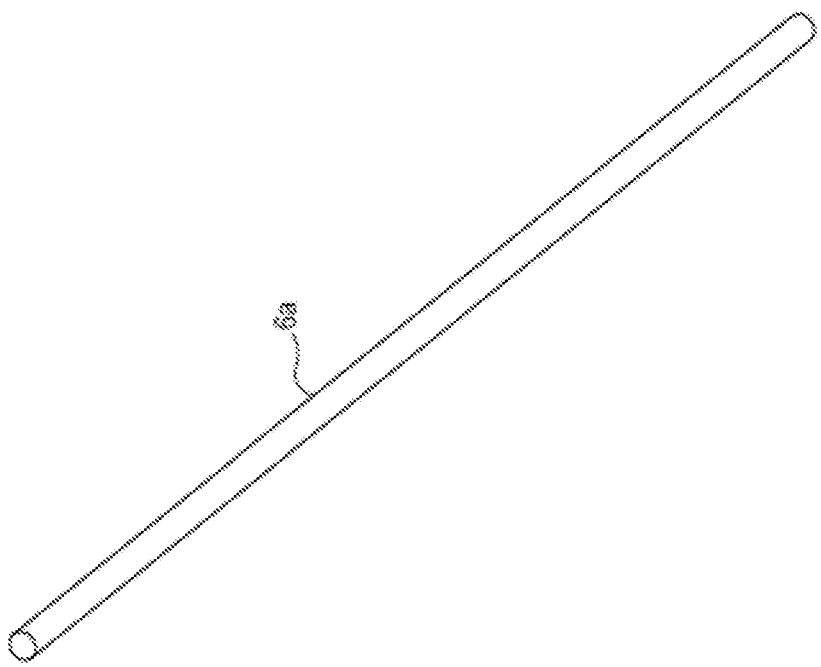
FIG. 52 illustrates a perspective view of an embodiment of a long pushrod of a water level indicator.

FIGS. 52-54 illustrate pushrods 6 of a water level indicator 1 in accordance with an embodiment of the invention. The pushrods 6 may have a first end secured to an indicator flag cap 3, and a second end secured to a float cage 4. The length of each pushrod may be measured from the first end to the second end. As shown in FIGS. 2, and 52-54, each pushrod 6a, 6b, 6c has a different length. Persons of skill in the art will recognize that the pushrods may be sized to convey the desired water level. For example, in the exemplary embodiment, which is designed such that each of the indicator flag caps represents one-third of the liquid in the liquid reservoir, the longest pushrod 6c is sized such that the float 5c will push the indicator flag cap 3 connected to pushrod 6c to the top of the upper housing when the liquid reservoir 16 is one-third full. Similarly, the intermediate pushrod 6b is sized such that the float 5b will push the indicator flag cap 3 connected to pushrod 6b to the top of the upper housing when the liquid reservoir 16 is two-thirds full. Finally, the smaller pushrod 6a is sized such that the float 5c will push the indicator flag cap 3 connected to pushrod 6c to the top of the upper housing when the liquid reservoir 16 is one-third full.

The pushrods 6 may be cylindrical, rectangular, or any other suitable shape. They may have a consistent cross-section, or the cross section may vary. They should be sized such that the cross section of the pushrod 6 is smaller than, and slidably passes through the through holes 24, 41, 51 in the upper housing 2, float cage 4, and float 5. The pushrods may be made of plastic, metal or any other suitable material or combination of materials. The pushrods may have stops (not shown) on them at an appropriate distance from the bottom of the extension walls 27 of the upper housing to limit how far up they can push the indicator flag cap 3.

FIG. 55 illustrates a partially assembled indicator 1 showing a connected float 5, float cage 4, pushrod 6 and indicator flag cap 3. As discussed above, when the level of the liquid in the liquid reservoir 16 is higher than the bottom of the float 5, it begins to force the float 5 upwards, which in turn pushes the float cage 4, and the pushrod 6 secured to that float rod upwards, which in turn pushes the indicator flag cap 3. When the liquid is at a sufficient level, the indicator flag cap 3 is pushed to the top of its respective cavity 21 the upper housing 2, where it can be easily seen by an observer.

Figure 56:
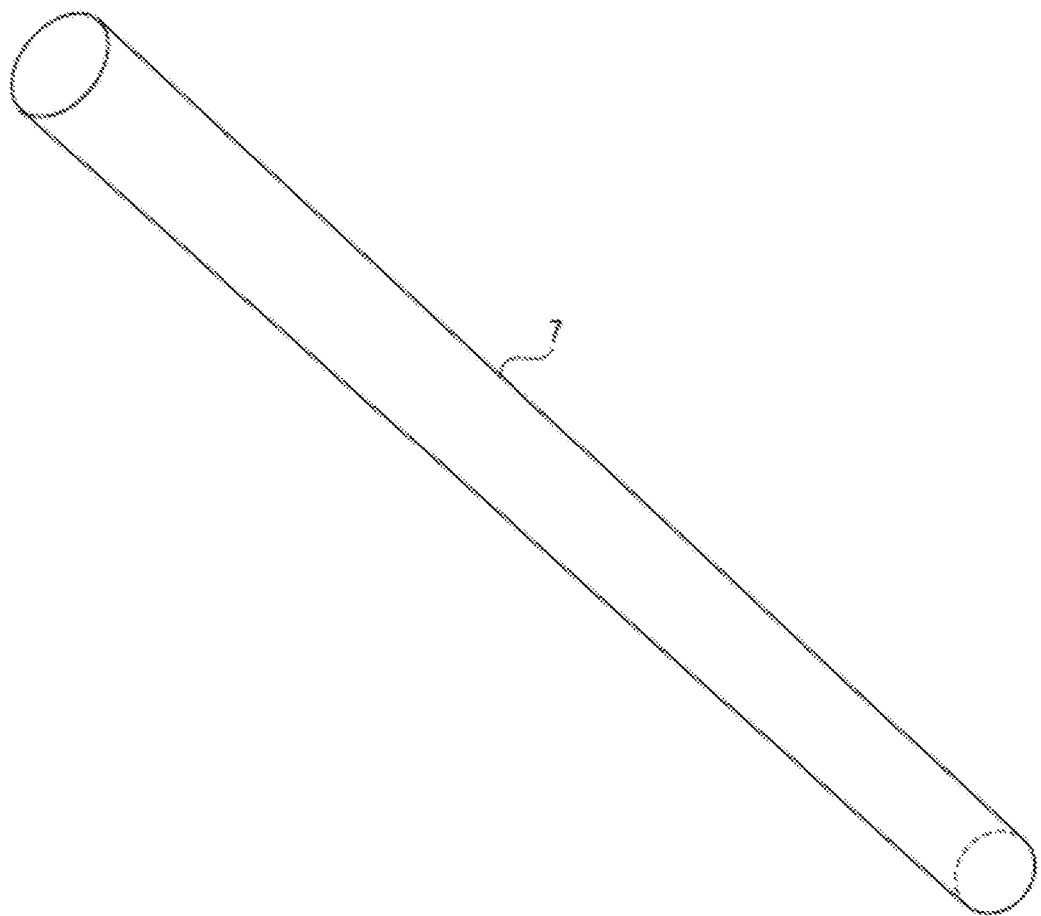
FIG. 56 illustrates a perspective view of an embodiment of a shell of a water level indicator.

FIG. 56 illustrates an embodiment of shell 7 of a water level indicator in accordance with the disclosure. The shell 7 houses the interior components of the water level indicator 1, including the float cages 4, floats 5, and pushrods 6. The shell 7 may have a first end that is secured over the outer wall 23 of the upper housing 2, and a second end that is secured over the bottom cap 9. Persons of skill in the art will recognize that alternative embodiments where the upper housing 2 or the bottom cap 9 are secured over the shell, or where the shell is made of a unitary construction with one or both of the upper housing or bottom cap, are within the contemplated scope of this disclosure. Likewise, as discussed above, the shape of the shell 7 may be cylindrical, square, or any other suitable shape. The shape of the shell 7 may be complementary to the upper housing 2 and/or the bottom cap 9 where those structures are secured to the shell. Shell 7 may be in fluid communication with reservoir 16 to permit liquid to enter into shell 7 proportionally to liquid fill-level of reservoir 16.

Figure 57:
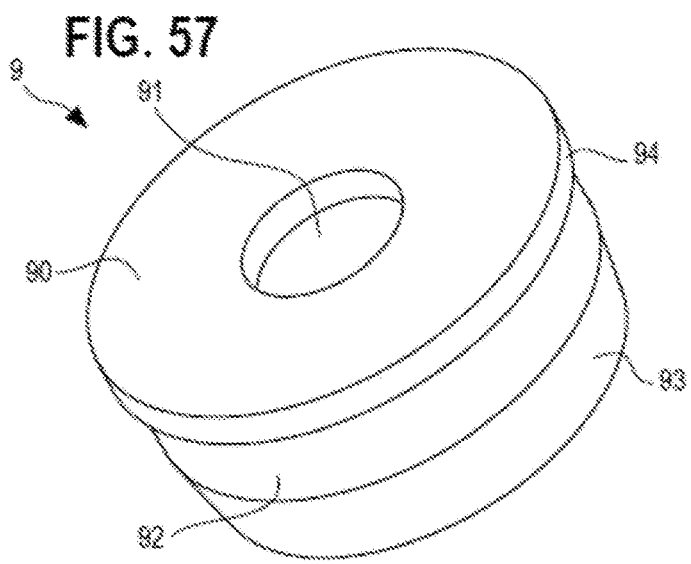
FIG. 57 illustrates a perspective view from below of an embodiment of a bottom cap of a water level indicator.
Figure 58:
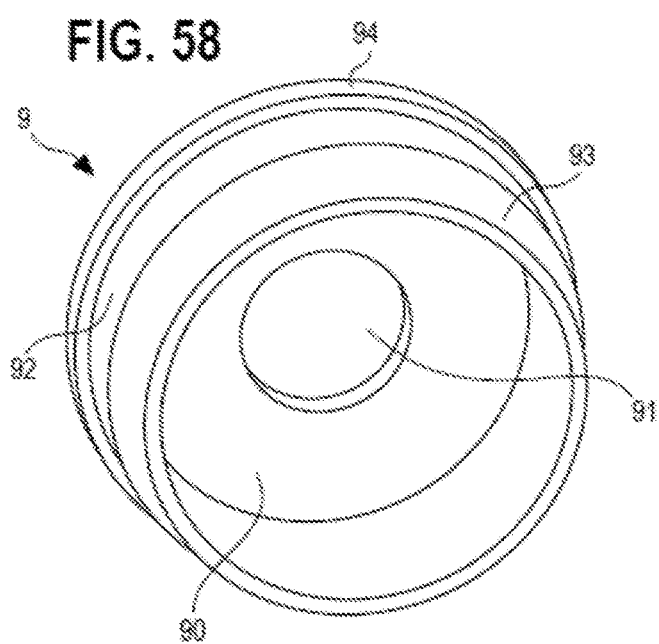
FIG. 58 illustrates a perspective view from above of the bottom cap of FIG. 57.
Figure 59:
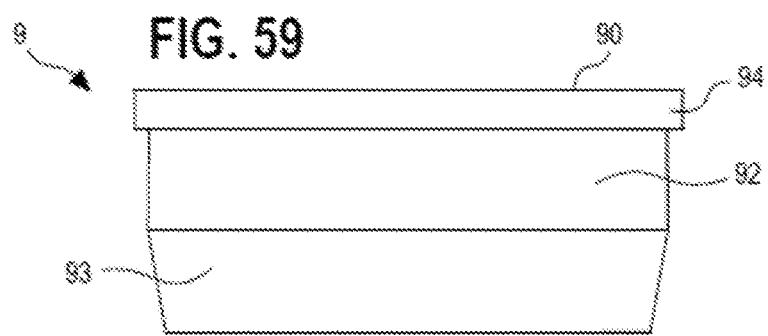
FIG. 59 illustrates a side view of the bottom cap of FIG. 57.
Figure 60:
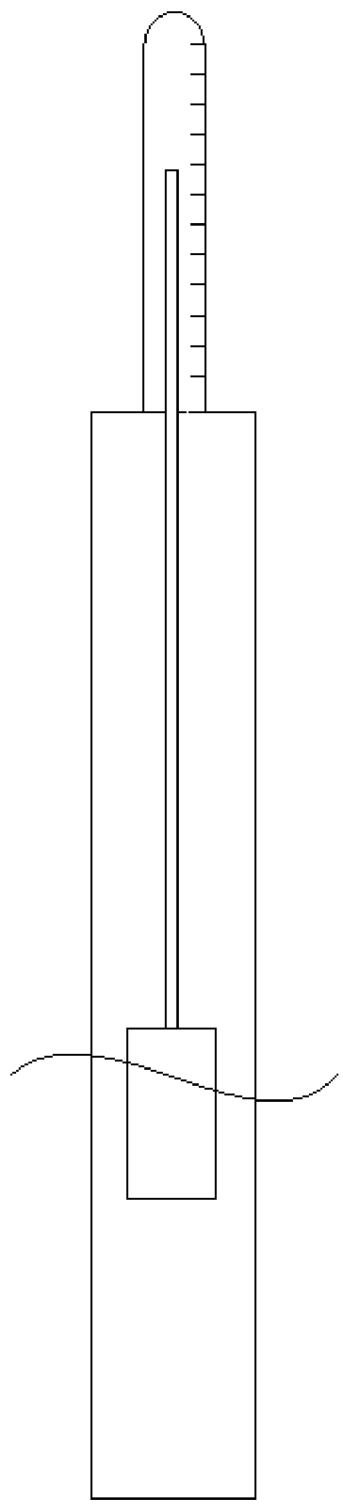
FIG. 60 illustrates a side view of a prior art water level indicator.

FIGS. 57-59 illustrate a bottom cap 9 of a water level indicator 1 in accordance with an embodiment of the invention. The bottom cap 9 may attach to the bottom of the shell 7. As shown in FIGS. 57-59, the bottom cap 9 may have a bottom floor 90 which may have an inlet 91. The bottom floor 90 may also have an outer rim 94. A sidewall 92 may extend upwards from the bottom floor 90. The sidewall 92 may have a tapered portion 93 that may be sloped or chamfered to facilitate securing the bottom cap to the shell. The bottom cap 9 may be made of plastic, metal, or any other suitable material or combination of materials.

The inlet 91 in the floor allows water to enter the interior of the shell 7, and interact with the floats 5 and float cages 4. As discussed above with respect to the upper housing 2 and shell 7, the bottom cap may have a circular or square shape, or any other desired suitable shape. The side wall 92 of the bottom cap 9 should have a shape complementary to the shape of the shell. The side may comprise multiple side walls. In some embodiments the sidewall 92 may fit within the shell 7. In some such embodiments, the floor may have a rim 94, that extends beyond the side walls 92 and that may receive the ends of the shell 7. Alternatively, the bottom cap 9 may be rim-less, and may fit entirely within the shell 7. In other embodiments the sidewall 92 of bottom cap 9 may attach over the shell 7. The bottom cap 9 may be secured to the shell 7 in any manner known in the art, including without limitation through the use of adhesives, friction fits, threading, projections and recesses, and locking pins. As discussed above with respect to the top cap 8, the bottom cap 9 may be detachable or may be permanently secured to the shell 7. In other some embodiments the bottom cap 9 may be part of the shell 7, and of unitary construction with the shell 7.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions, types of materials and coatings described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. § 112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A liquid level indicator for a liquid container comprising:
   a top end and a bottom end; and
   a plurality of pushrods comprising a first pushrod and a second pushrod, each of the pushrods comprising a first end, a second end, and a float;
   wherein the floats on each of the pushrods are arranged such that the first pushrod is pushed towards, with the first pushrod first end reaching, the top end when the liquid container is filled to a first level, and the second pushrod is pushed towards, with the second pushrod first end reaching, the top end when the liquid container is filled to a second level,
   wherein the second level is higher than the first level.

2. The liquid level indicator of claim 1, wherein each of the plurality of pushrods further comprises an indicator flag cap provided at the first end.

3. The liquid level indicator of claim 1 wherein the first level corresponds with the liquid container being about half full, and wherein the second level corresponds with the liquid container being about full.

4. The liquid level indicator of claim 1 wherein the first level corresponds with the liquid container being about one-third full, and wherein the second level corresponds with the liquid container being about full.

5. The liquid level indicator of claim 1 wherein the plurality of pushrods further comprises a third pushrod, and wherein the floats on each of the pushrods are further arranged such that the third pushrod is pushed towards, with the third pushrod first end reaching, the top end when the liquid container is filled to a third level,
   wherein the third level is higher than the second level.

6. The liquid level indicator of claim 5 wherein the first level corresponds with the liquid container being about one-third full, the second level corresponds with the liquid container being about two-thirds full, and the third level corresponds with the liquid container being about full.

7. The liquid level indicator of claim 1 wherein each pushrod of the plurality of pushrods comprises a unitary structure.

8. The liquid level indicator of claim 1 further comprising an upper housing disposed near the top end.

9. A self-watering planter comprising:
   an internal wall and floor defining a plant cavity;
   an external wall surrounding a water reservoir;
   an inlet capable of allowing water to enter the water reservoir; and
   a liquid level indicator comprising,
   a top end and a bottom end; and
   a plurality of pushrods comprising a first pushrod and a second pushrod, each of the pushrods comprising a first end, a second end, and a float;
   wherein the floats on each of the pushrods are arranged such that the first pushrod is pushed towards, with the first pushrod first end reaching, the top end when the liquid container is filled to a first level, and the second pushrod is pushed towards, with the second pushrod first end reaching, the top end when the liquid container is filled to a second level,
   wherein the second level is higher than the first level.

10. The self-watering planter of claim 9, wherein each of the plurality of pushrods further comprises an indicator flag cap provided at the first end.

11. The self-watering planter of claim 9, wherein the first level corresponds with the liquid container being about half full, and wherein the second level corresponds with the liquid container being about full.

12. The self-watering planter of claim 9, wherein the first level corresponds with the liquid container being about one-third full, and wherein the second level corresponds with the liquid container being about full.

13. The self-watering planter of claim 9 wherein the plurality of pushrods further comprises a third pushrod, and wherein the floats on each of the pushrods are further arranged such that the third pushrod is pushed towards, with the third pushrod first end reaching, the top end when the liquid container is filled to a third level,
   wherein the third level is higher than the second level.

14. The self-watering planter of claim 13 wherein the first level corresponds with the liquid container being about one-third full, the second level corresponds with the liquid container being about two-thirds full, and the third level corresponds with the liquid container being about full.

15. The self-watering planter of claim 9 wherein each pushrod of the plurality of pushrods comprises a unitary structure.

16. The self-watering planter of claim 9 further comprising an upper housing disposed near the top end.

17. A liquid level indicator comprising:
   top end and a bottom end; and
   a plurality of pushrods comprising a first pushrod and a second pushrod, each of the pushrods comprising a first end, a second end, and a float;
   wherein the floats on each of the pushrods are arranged such that the first pushrod is pushed towards, with the first pushrod first end reaching, the top end when the liquid container is filled to a first level, and the second pushrod is pushed towards, with the second pushrod first end reaching, the top end when the liquid container is filled to a second level,
   wherein the second level is higher than the first level, and
   wherein the plurality of pushrods are all provided within a shell.

18. The liquid level indicator of claim 17, wherein each of the plurality of pushrods further comprises an indicator flag cap provided at the first end.

19. The liquid level indicator of claim 17, wherein the plurality of pushrods further comprises a third pushrod, and wherein the floats on each of the pushrods are further arranged such that the third pushrod is pushed towards, with the third pushrod first end reaching, the top end when the liquid container is filled to a third level,
   wherein the third level is higher than the second level.

20. The liquid level indicator of claim 17 wherein each pushrod of the plurality of pushrods comprises a unitary structure.

* * * * *